United States Patent
Ohki et al.

(10) Patent No.: US 10,261,304 B2
(45) Date of Patent: Apr. 16, 2019

(54) STRUCTURED ILLUMINATING MICROSCOPY APPARATUS

(71) Applicant: NIKON CORPORATION, Tokyo (JP)

(72) Inventors: Hiroshi Ohki, Yokohama (JP); Tomoya Noda, Saitama (JP); Yosuke Okudaira, Konosu (JP)

(73) Assignee: NIKON CORPORATION, Tokyo (JP)

( * ) Notice: Subject to any disclaimer, the term of this patent is extended or adjusted under 35 U.S.C. 154(b) by 678 days.

(21) Appl. No.: 14/597,495

(22) Filed: Jan. 15, 2015

(65) Prior Publication Data

US 2015/0185463 A1 Jul. 2, 2015

Related U.S. Application Data

(63) Continuation of application No. PCT/JP2013/004338, filed on Jul. 16, 2013.

(30) Foreign Application Priority Data

Jul. 19, 2012 (JP) .................... 2012-160805

(51) Int. Cl.
 *H04N 7/18* (2006.01)
 *G02B 21/36* (2006.01)
 (Continued)

(52) U.S. Cl.
 CPC ........... *G02B 21/365* (2013.01); *G02B 21/06* (2013.01); *G02B 21/361* (2013.01); *G02B 21/367* (2013.01); *G02B 27/58* (2013.01)

(58) Field of Classification Search
 CPC .... G02B 21/06; G02B 21/361; G02B 21/367; G02B 27/58
 (Continued)

(56) References Cited

U.S. PATENT DOCUMENTS

| | | | | |
|---|---|---|---|---|
| 5,142,140 A | * | 8/1992 | Yamazaki | .......... G01N 15/1459 250/222.2 |
| 6,259,561 B1 | * | 7/2001 | George | ................ G02B 5/0221 359/566 |

(Continued)

FOREIGN PATENT DOCUMENTS

| | | |
|---|---|---|
| JP | 2009-098215 A | 5/2009 |
| JP | 2009-157084 A | 7/2009 |
| JP | 2012-504252 A | 2/2012 |

OTHER PUBLICATIONS

Orieux et al., "Bayesian Estimation for Optimized Structured Illumination Microscopy," IEEE Transactions on Image Processing, Feb. 2012, vol. 21, No. 2, pp. 601-614.

(Continued)

*Primary Examiner* — Helen Shibru
(74) *Attorney, Agent, or Firm* — Oliff PLC

(57) ABSTRACT

An acquiring unit of a structured illuminating microscopy apparatus acquires at least two modulated images having the same wave number vector and the different phases; and a calculating unit of the structured illuminating microscopy apparatus, in a spatial frequency spectrum of each of at least the two modulated images acquired by the acquiring unit, separates a 0th-order modulating component and ±first-order modulating components of observational light fluxes superimposed on arbitrary two observation points based on at least four observation values regarding the two observation points which are mutually displaced by an amount of the wave number vector.

1 Claim, 18 Drawing Sheets

(51) Int. Cl.
*G02B 21/06* (2006.01)
*G02B 27/58* (2006.01)

(58) Field of Classification Search
USPC .................. 348/79; 359/385; 349/113, 5
See application file for complete search history.

(56) References Cited

U.S. PATENT DOCUMENTS

| | | |
|---|---|---|
| RE38,307 E | 11/2003 | Gustafsson et al. |
| 2006/0061712 A1* | 3/2006 | Abe ............... G02B 27/283 349/113 |
| 2010/0139405 A1* | 6/2010 | Melikechi .......... G01H 9/004 73/655 |
| 2010/0157422 A1* | 6/2010 | Ouchi ................ G02B 21/14 359/385 |
| 2011/0182529 A1 | 7/2011 | Kempe et al. |
| 2012/0026311 A1 | 2/2012 | Ouchi et al. |
| 2012/0099172 A1* | 4/2012 | Ohki ............... G02B 21/086 359/239 |
| 2012/0308120 A1* | 12/2012 | Placko ............. G01N 27/9046 382/154 |
| 2013/0021613 A1* | 1/2013 | Furxhi ............... G02B 26/10 356/445 |
| 2016/0216505 A1* | 7/2016 | Okudaira ......... G02B 21/0076 |

OTHER PUBLICATIONS

Sep. 24, 2013 International Search Report issued in International Application No. PCT/JP2013/004338.
Jan. 20, 2015 International Preliminary Report on Patentability issued in International Application No. PCT/JP2013/004338.

* cited by examiner

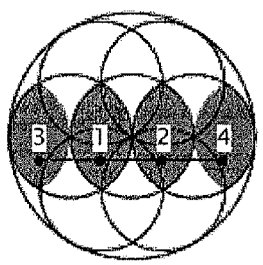
FIRST STEP
FIG.21A
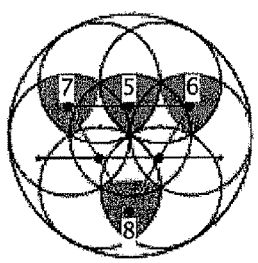
SECOND STEP
FIG.21B
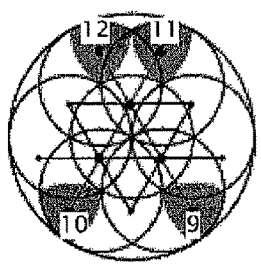
THIRD STEP
FIG.21C
1   $\tilde{I}_o(\xi)$
2   $\tilde{I}_o(\xi + \xi_1)$
3   $\tilde{I}_o(\xi - \xi_1)$
4   $\tilde{I}_o(\xi + 2\xi_1)$
5   $\tilde{I}_o(\xi + \xi_2)$
6   $\tilde{I}_o(\xi + \xi_2 + \xi_1)$
7   $\tilde{I}_o(\xi + \xi_2 - \xi_1)$
8   $\tilde{I}_o(\xi + \xi_1 - \xi_2)$
9   $\tilde{I}_o(\xi + 2\xi_1 - \xi_2)$
10   $\tilde{I}_o(\xi - \xi_2)$
11   $\tilde{I}_o(\xi + 2\xi_2)$
12   $\tilde{I}_o(\xi + 2\xi_2 - \xi_1)$
FIG.21D

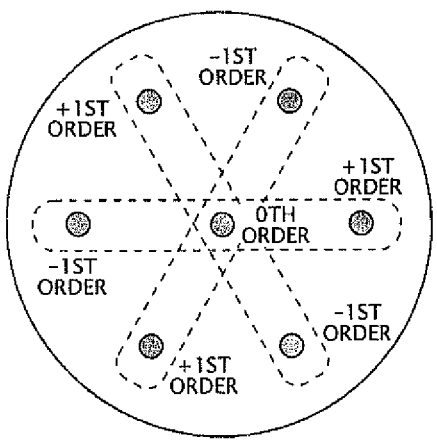
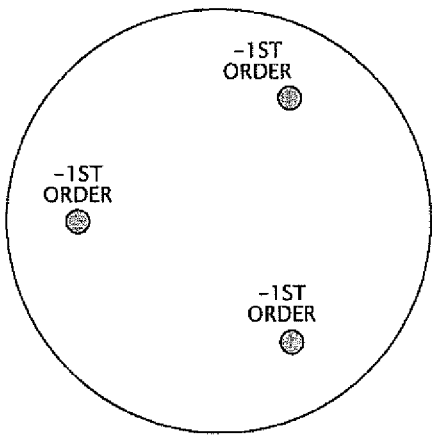
FIG.25A  FIG.25B
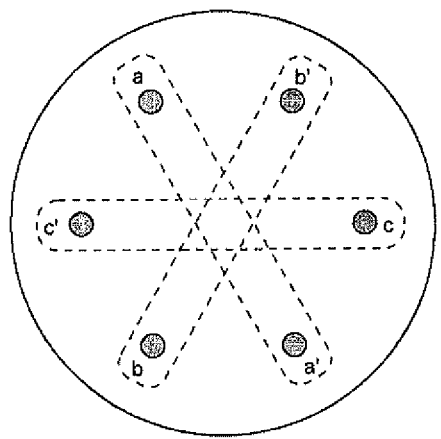
FIG.26

STRUCTURED ILLUMINATING MICROSCOPY APPARATUS

CROSS-REFERENCE TO RELATED APPLICATION

This application is a continuation application of International Application No. PCT/JP2013/004338, filed on Jul. 16, 2013, designating the U.S., and claims the benefit of priority from Japanese Patent Application No. 2012-160805, filed on Jul. 19, 2012, the entire contents of which are incorporated herein by reference.

BACKGROUND

1. Field

The present application relates to a structured illuminating microscopy apparatus.

2. Description of the Related Art

As a method of performing a super-resolved observation on an observational object such as an organism sample, there is one in which a spatial frequency of a structure of the observational object is modulated by illuminating lights (refer to the specification of U.S. Pat. No. RE 38,307).

In this method, the observational object is illuminated by the spatially-modulated illuminating lights, and information regarding a high spatial frequency that exceeds a resolution limit included in the structure of the observational object is made to be contributed to an image formation of a microscopy optical system. Further, by performing a calculation on a plurality of pieces of data after being subjected to modulating image formation obtained by switching phases of spatial illumination and under mutually different phases (referred to as "modulated images", hereinafter), data after being subjected to demodulating image formation (referred to as "demodulated image" or "super-resolved image", hereinafter) is acquired.

However, in order to observe one piece of super-resolved image, there is a need to acquire a plurality of pieces of modulated images, and to generate spectra of the respective modulated images, so that it is difficult to perform the observation at high speed.

SUMMARY

One example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires at least two modulated images each having the wave number vector being the same and the phase being different; and the calculating unit, in a spatial frequency spectrum of each of at least the two modulated images acquired by the acquiring unit, separates a 0th-order modulating component and ±first-order modulating components of the observational light fluxes superimposed on arbitrary two observation points based on at least four observation values regarding the two observation points which are mutually displaced by an amount of the wave number vector.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires, among three wave number vectors having a mutually closed relationship, one modulated image under each of two wave number vectors, and acquires at least two modulated images each having the phase being different under the other one wave number vector; and the calculating unit, in a spatial frequency spectrum of each of at least the four modulated images acquired by the acquiring unit, separates a 0th-order modulating component and ±first-order modulating components of the observational light fluxes superimposed on arbitrary three observation points based on twelve observation values regarding the three observation points which are mutually displaced by an amount of the three wave number vectors.

Note that it is also possible that the acquiring unit sets a phase contrast between the at least two modulated images each having the phase being different to t.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires one modulated image under each of three wave number vectors having a mutually closed relationship, and acquires one non-modulated image; and the calculating unit, in a spatial frequency spectrum of each of the three modulated images and the one non-modulated image acquired by the acquiring unit, separates a 0th-order modulating component and ±first-order modulating components of the observational light fluxes superimposed on arbitrary three observation points based on twelve observation values regarding the three observation points which are mutually displaced by an amount of the three wave number vectors.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires four modulated images each having the phase being different by using the fringes simultaneously having three wave number vectors having a mutually closed relationship; and the calculating unit, in a spatial frequency spectrum of each of the four modulated images acquired by the acquiring unit, separates a 0th-order modulating component and ±first-order modulating components of the observational light fluxes superimposed on arbitrary three observation points based on twelve observation values regarding the three observation points which are mutually displaced by an amount of the three wave number vectors.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires three modulated images each having the wave number vector being the same and the phase being different; and the calculating unit, in a spatial frequency spectrum of each of the three modulated images acquired by the acquiring unit, separates a 0th-order modulating component, ±first-order modulating components and ±second-order modulating components of the observational light fluxes superimposed on arbitrary two observation points based on six observation values regarding the two observation points which are mutually displaced by an amount of the wave number vector.

Note that it is also possible that the acquiring unit sets a phase contrast among the three modulated images to $2\pi/3$.

Further, it is also possible that the acquiring unit acquires the three modulated images each having the phase being different under each of three wave number vectors having different directions; and the calculating unit performs the separation on each of the three wave number vectors.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires two modulated images each having the phase being different under each of three wave number vectors having a mutually closed relationship, and acquires one non-modulated image; and the calculating unit, in a spatial frequency spectrum of each of the six modulated images and the one non-modulated image acquired by the acquiring unit, separates ±first-order modulating components of the observational light flux superimposed on arbitrary three observation points based on twenty-one observation values regarding the three observation points which are mutually displaced by an amount of the three wave number vectors, and separates a 0th-order modulating component and ±second-order modulating components of the observational light fluxes superimposed on arbitrary three observation points based on twenty-one observation values regarding the three observation points which are mutually displaced by a doubled amount of the three wave number vectors.

Note that it is also possible that the acquiring unit sets a phase contrast between the two modulated images acquired under at least one of the wave number vector to $\pi$.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires four modulated images each having the phase being different under each of three wave number vectors having a mutually closed relationship; and the calculating unit, in a spatial frequency spectrum of each of the twelve modulated images acquired by the acquiring unit, separates ±first-order modulating components of the observational light flux superimposed on arbitrary three observation points based on thirty-six observation values regarding the three observation points which are mutually displaced by an amount of the three wave number vectors, and separates a 0th-order modulating component and ±second-order modulating components of the observational light fluxes superimposed on arbitrary three observation points based on thirty-six observation values regarding the three observation points which are mutually displaced by a doubled amount of the three wave number vectors.

Further, one example of a structured illuminating microscopy apparatus of the present embodiment includes an illuminating optical system performing a spatial modulation on a sample by fringes; an image-forming optical system performing a modulating image formation of the sample by forming an image of an observational light flux from the sample being performed the spatial modulation; an acquiring unit controlling at least one of a wave number vector of the fringes and a phase of the fringes, and capturing a result of the modulating image formation to acquire a modulated image of the sample; and a calculating unit generating an image of the sample based on the modulated image acquired by the acquiring unit, in which the acquiring unit acquires, among three wave number vectors having a mutually closed relationship, two modulated images each having the phase being different under each of two wave number vectors, and acquires four modulated images each having the phase being different under the other one wave number vector; and the calculating unit, in a spatial frequency spectrum of each of the eight modulated images acquired by the acquiring unit, separates ±first-order modulating components of the observational light flux superimposed on arbitrary three observation points based on twenty-four observation values regarding the three observation points which are mutually displaced by an amount of the three wave number vectors, and separates a 0th-order modulating component and ±second-order modulating components of the observational light fluxes superimposed on arbitrary three observation points based on twenty-four observation values regarding the three observation points which are mutually displaced by a doubled amount of the three wave number vectors.

Note that it is also possible that the acquiring unit sets a phase contrast among the four modulated images each having the phase being different to $\pi/2$.

Further, it is also possible that the three wave number vectors are the vectors having a same magnitude and whose directions are different from one another by 120°.

BRIEF DESCRIPTION OF THE DRAWINGS

FIGS. 21A to 21D are diagrams explaining, in detail, the expression 1.33 in Section 1.6.

FIG. 25A and FIG. 25B are diagrams explaining a projection method of the three-direction interference fringes.

FIG. 26 is a diagram explaining another projection method of the three-direction interference fringes.

DETAILED DESCRIPTION OF THE EMBODIMENTS

Hereinafter, a structured illuminating microscopy apparatus will be described as an embodiment of the present invention.

[Explanation of Apparatus]

First, a configuration of a structured illuminating microscopy apparatus will be described.

Figure 1:
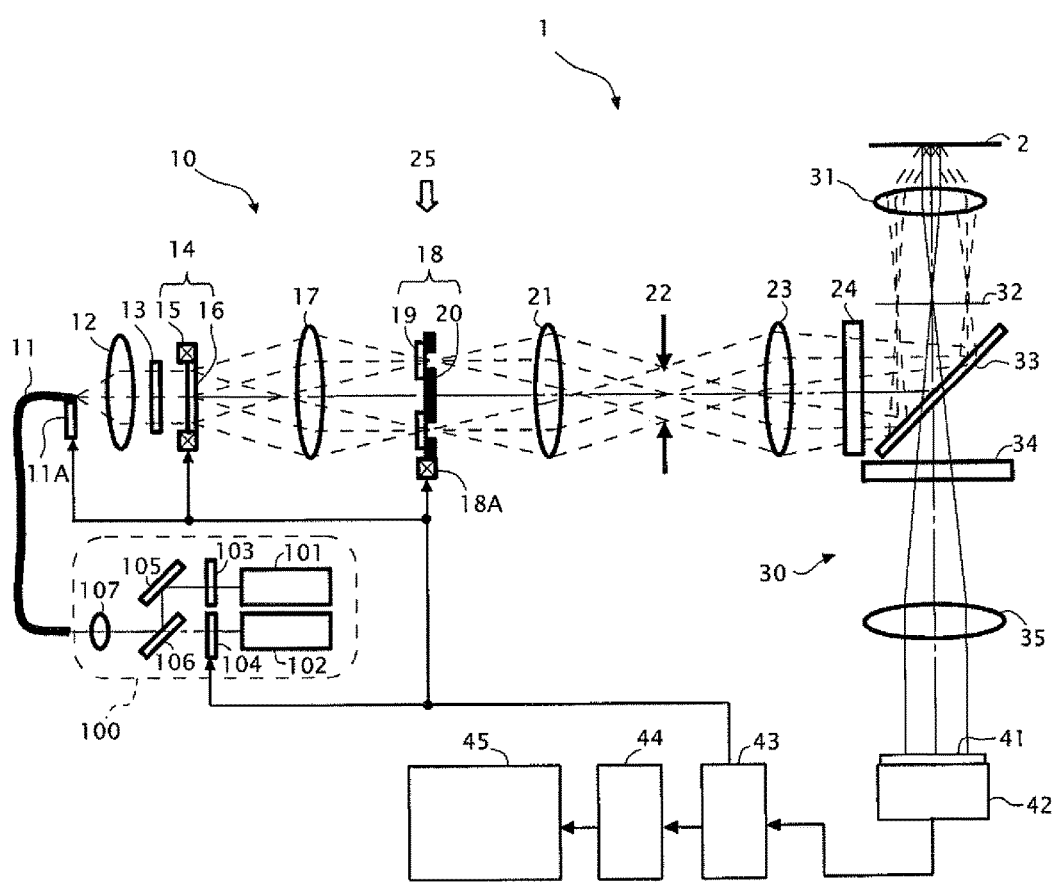
FIG. 1 is a configuration diagram of a structured illuminating microscopy apparatus 1 of a first embodiment.

FIG. 1 is a configuration diagram of a structured illuminating microscopy apparatus 1. As illustrated in FIG. 1, there are provided, in the structured illuminating microscopy apparatus 1, a laser unit 100, an optical fiber 11, an illuminating optical system 10, an image-forming optical system 30, an imaging sensor 42, a controlling device 43, an image storing-calculating device 44, and an image displaying device 45. Note that the illuminating optical system 10 is one of epi-illumination type, and illuminates a sample 2 by utilizing an objective lens 31 and a dichroic mirror 33 of the image-forming optical system 30.

In the laser unit 100, there are provided a first laser light source 101, a second laser light source 102, shutters 103 and 104, a mirror 105, a dichroic mirror 106, and a lens 107. Each of the first laser light source 101 and the second laser light source 102 is a coherent light source, and exit wavelengths of the laser light sources are mutually different. Here, it is assumed that a wavelength $\lambda 1$ of the first laser light source 101 is longer than a wavelength $\lambda 2$ of the second laser light source 102 ($\lambda 1 > \lambda 2$). The first laser light source 101, the second laser light source 102, and the shutters 103 and 104 are respectively driven by the controlling device 43.

The optical fiber 11 is formed of, for example, a single-mode fiber of polarization-maintaining type to guide a laser light exited from the laser unit 100. A position in an optical axis direction of an exit end of the optical fiber 11 can be adjusted by a position adjusting mechanism 11A. The position adjusting mechanism 11A is driven by the controlling device 43.

In the illuminating optical system 10, there are disposed a collector lens 12, a polarizing plate 13, a beam branching section 14, a collecting lens 17, a beam selecting section 18, a lens 21, a field stop 22, a field lens 23, an excitation filter 24, the dichroic mirror 33, and the objective lens 31, in this order from an exit end side of the optical fiber 11.

The beam branching section 14 is provided with a translatory shifting mechanism 15 and a diffractive optical element (diffraction grating) 16, and the beam selecting section 18 is provided with a ½ wavelength plate 19, a beam selecting element 20, and a rotating mechanism 18A. Each of the beam branching section 14 and the beam selecting section 18 is driven by the controlling device 43.

In the image-forming optical system 30, there are disposed the objective lens 31, the dichroic mirror 33, an absorption filter 34, and a secondary objective lens 35, in this order from a side of the sample 2.

The sample 2 is, for example, a culture fluid dropped on a surface of parallel-plate glass, and a cell having a fluorescence exists in the vicinity of a glass interface in the culture fluid. In the cell, both of a first fluorescent area which is excited by a light with the wavelength $\lambda 1$, and a second fluorescent area which is excited by a light with the wavelength $\lambda 2$, are exhibited.

The imaging sensor 42 is a two-dimensional imaging sensor formed of a CCD, a CMOS or the like. When the imaging sensor 42 is driven by the controlling device 43, it captures an image formed on its imaging plane 41, and generates an image. The image is taken into the image storing-calculating device 44 via the controlling device 43.

The controlling device 43 drives and controls the laser unit 100, the position adjusting mechanism 11A, the beam branching section 14, the beam selecting section 18, and the imaging sensor 42.

The image storing-calculating device 44 performs calculation with respect to the image given via the controlling device 43, stores an image after being subjected to the calculation in a not-illustrated internal memory, and at the same time, it sends the image to the image displaying device 45.

Next, a behavior of laser light in the structured illuminating microscopy apparatus 1 will be described.

A laser light with the wavelength $\lambda 1$ exited from the first laser light source 101 (first laser light) is incident on the mirror 105 via the shutter 103, and reflected by the mirror 105 to be incident on the dichroic mirror 106. Meanwhile, a laser light with the wavelength $\lambda 2$ exited from the second laser light source 102 (second laser light) is incident on a beam splitter 106 via the shutter 104, and combined with the first laser light. The first laser light and the second laser light exited from the dichroic mirror 106 are incident on an incident end of the optical fiber 11 via the lens 107. Note that when the controlling device 43 controls the laser unit 100, the wavelength (=use wavelength $\lambda$) of laser light which is incident on the incident end of the optical fiber 11, is switched between the long wavelength $\lambda 1$ and the short wavelength $\lambda 2$.

The laser light incident on the incident end of the optical fiber 11 propagates in the optical fiber 11, and generates a point light source at the exit end of the optical fiber 11. The laser light exited from the point light source is converted into a collimated light flux by the collector lens 12 to be incident on the diffraction grating 16 of the beam branching section 14 via the polarizing plate 13, and then branched into diffractive light fluxes of respective orders. The diffractive light fluxes of respective orders are collected by the collecting lens 17 at mutually different positions on a pupil conjugate plane 25.

Here, the pupil conjugate plane 25 indicates a focal position of the lens 17 (rear focal position), and a position conjugated with a pupil 32 of the objective lens 31 (a position at which ±first-order diffractive lights are collected) via the lens 23 and the lens 21 (note that a position determined by a person skilled in the art by taking the design requirements such as aberration, vignetting and the like of the collecting lens 17, and the lenses 21 and 23 into consideration, also falls into the concept of "conjugate position").

Note that since the laser light exited from the optical fiber 11 is basically linearly polarized, the polarizing plate 13 can be omitted, but, the polarizing plate 13 is effective to securely cut an excess polarization component. Further, in order to increase a utilization efficiency of the laser light, an axis of the polarizing plate 13 desirably coincides with a polarization direction of the laser light exited from the optical fiber 11.

The diffractive light fluxes of respective orders directed to the pupil conjugate plane 25 are incident on the beam selecting section 18 which is disposed in the vicinity of the pupil conjugate plane 25.

The beam selecting section 18 makes only a pair of diffractive light fluxes (only ±first-order diffractive light fluxes, in this case), out of the incident diffractive light fluxes of respective orders, to be selectively passed therethrough.

The ±first-order diffractive light fluxes passed through the beam selecting section 18 form, with the use of the lens 21, a plane conjugated with the diffraction grating 16 in the vicinity of the field stop 22, and are then converted into a collimated light by the field lens 23. Further, the collimated light passes through the excitation filter 24, and is reflected by the dichroic mirror 33 to be collected at mutually different positions on the pupil plane 32 of the objective lens 31.

The respective ±first-order diffractive light fluxes collected on the pupil plane 32 are turned into collimated light fluxes when being exited from a tip of the objective lens 31, and interfere with each other on a surface of the sample 2, to thereby form interference fringes. The interference fringes are used as structured illuminating lights.

When the sample 2 is illuminated by such structured illuminating lights, a moiré fringe corresponding to a difference between a pitch structure of the structured illuminating lights and a pitch structure of the sample 2 (of the fluorescent area) appears, in which on the moiré fringe, a structure of high frequency of the sample 2 is shifted to a side of frequency that is lower than the original frequency, so that a light (fluorescence) that exhibits this structure is directed to the objective lens 31 at an angle smaller than the original angle. Therefore, when the sample 2 is illuminated by the structured illuminating lights, even structural information of the high frequency of the sample 2 (of the fluorescent area) is transmitted by the objective lens 31.

The fluorescence generated in the sample 2 is incident on the objective lens 31, and converted into a collimated light by the objective lens 31, and after that, the collimated light transmits through the dichroic mirror 33 and a barrier filter 34, and a modulating image formation of the sample 2 is performed on the imaging plane 41 of the imaging sensor 42 via the secondary objective lens 35.

A result of the modulating image formation is subjected to imaging by the imaging sensor 42, and a result thereof is taken into the image storing-calculating device 44 via the controlling device 43. Further, the image storing-calculating device 44 performs a demodulating calculation (details will be described later) on the modulated image taken therein, thereby generating a demodulated image (super-resolved image). Further, the super-resolved image is stored in the internal memory (not illustrated) of the image storing-calculating device 44, and at the same time, it is sent to the image displaying device 45.

Next, the beam branching section 14 will be described in detail.

Figure 2A:
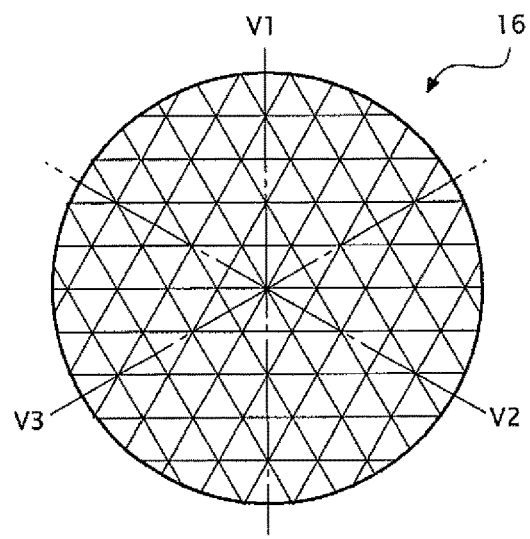
FIG. 2A and FIG. 2B are diagrams each explaining a beam branching section 14.
Figure 2B:
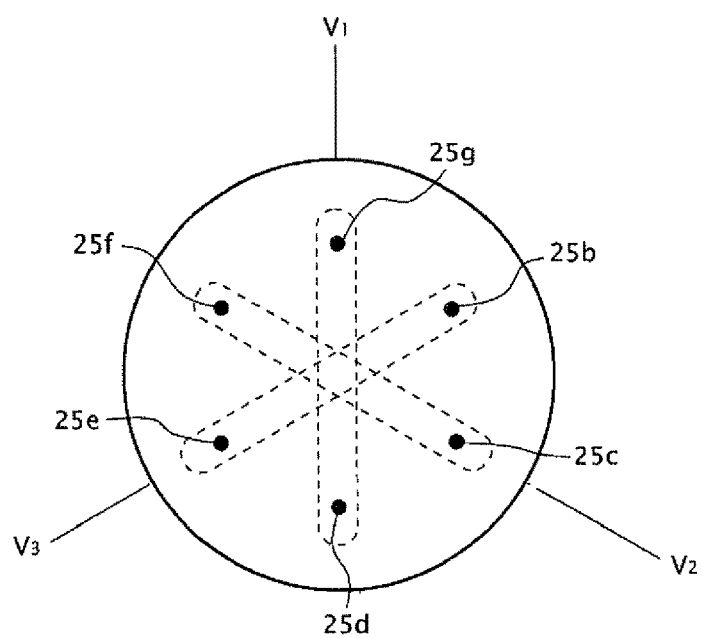

FIG. 2 are diagrams each explaining the beam branching section 14, in which FIG. 2A is a diagram in which the diffraction grating 16 of the beam branching section 14 is seen from the optical axis direction, and FIG. 2B is a diagram illustrating a positional relationship of collecting points formed on a pupil conjugate plane by ±first-order diffractive light fluxes. Note that FIG. 2A is a schematic diagram, so that a structural pitch of the diffraction grating 16 illustrated in FIG. 2A is not always the same as an actual structural pitch.

As illustrated in FIG. 2A, the diffraction grating 16 is a two-dimensional diffraction grating having pitch structures along mutually different plural directions perpendicular to the optical axis of the illuminating optical system 10. Here, the diffraction grating 16 has a pitch structure along each of a first direction V1, a second direction V2, and a third direction V3, the directions being different from one another by 120°, and it is assumed that pitches of the pitch structures are common.

Note that the pitch structure of the diffraction grating 16 may be either a pitch structure of density type formed by utilizing a density (transmittance), or a pitch structure of phase type formed by utilizing a level difference (phase contrast), but, the pitch structure of phase contrast type is more preferable in a point that a diffraction efficiency of +first-order diffractive light is high.

A collimated light flux incident on such a diffraction grating 16 is converted into a first diffractive light flux group branched along the first direction V1, a second diffractive light flux group branched along the second direction V2, and a third diffractive light flux group branched along the third direction V3.

The first diffractive light flux group includes a 0th-order diffractive light flux and ±first-order diffractive light fluxes, and the ±first-order diffractive light fluxes each having a common order, out of the above, travel in directions symmetric with respect to the optical axis.

In like manner, the second diffractive light flux group includes a 0th-order diffractive light flux and ±first-order diffractive light fluxes, and the ±first-order diffractive light fluxes each having a common order, out of the above, travel in directions symmetric with respect to the optical axis.

In like manner, the third diffractive light flux group includes a 0th-order diffractive light flux and ±first-order diffractive light fluxes, and the ±first-order diffractive light fluxes each having a common order, out of the above, travel in directions symmetric with respect to the optical axis.

The ±first-order diffractive light fluxes of the first diffractive light flux group, the ±first-order diffractive light fluxes of the second diffractive light flux group, and the ±first-order diffractive light fluxes of the third diffractive light flux group, are collected, by the aforementioned collecting lens 17, at mutually different positions within the pupil conjugate plane.

Further, as illustrated in FIG. 2B, collecting points 25*d* and 25*g* of the ±first-order diffractive light fluxes of the first diffractive light flux group are symmetric with respect to the optical axis, and an arranging direction of the collecting points 25*d* and 25*g* corresponds to the first direction V1.

Further, collecting points 25*c* and 25*f* of the ±first-order diffractive light fluxes of the second diffractive light flux group are symmetric with respect to the optical axis, and an arranging direction of the collecting points 25*c* and 25*f* corresponds to the second direction V2. Note that a displace amount between the collecting points 25*c* and 25*f* of the second diffractive light flux group is the same as a displace amount between the collecting points 25*d* and 25*g* of the first diffractive light flux group.

Further, collecting points 25*b* and 25*e* of the ±first-order diffractive light fluxes of the third diffractive light flux group are symmetric with respect to the optical axis, and an arranging direction of the collecting points 25*b* and 25*e* corresponds to the third direction V3. Note that a displace amount between the collecting points 25*b* and 25*e* of the third diffractive light flux group is the same as a displace amount between the collecting points 25*d* and 25*g* of the first diffractive light flux group.

In the above-described beam branching section 14, the translatory shifting mechanism 15 is formed of a piezoelectric motor or the like. The translatory shifting mechanism 15 makes the diffraction grating 16 to be translatory shifted in a direction perpendicular to the optical axis of the illuminating optical system 10, and a direction which is not perpendicular to each of the above-described first direction V1, second direction V2, and third direction V3. When the diffraction grating 16 is translatory shifted in this direction, a phase of fringes of the structured illuminating lights is shifted (details will be described later).

Next, the beam selecting section 18 will be described in detail.

FIG. 3 and FIG. 4 are diagrams explaining the beam selecting section 18. The ½ wavelength plate 19 of the beam selecting section 18 sets a polarization direction of incident diffractive light fluxes of respective orders, as illustrated in FIG. 3, and the beam selecting element 20 of the beam selecting section 18 is a mask which makes only the ±first-order diffractive light fluxes of any one of the first to third diffractive light flux groups to be selectively passed therethrough, as illustrated in FIG. 4.

Further, a not-illustrated rotating mechanism of the beam selecting section 18 makes the beam selecting element 20 rotate around the optical axis to switch the ±first-order diffractive light fluxes to be selected among the first to third diffractive light flux groups, and maintains a polarization direction when the selected ±first-order diffractive light fluxes are incident on the sample 2 to S polarization, by rotating the ½ wavelength plate 19 around the optical axis in conjunction with the beam selecting element 20.

Specifically, the beam selecting section 18 switches the direction of fringes of the structured illuminating lights while keeping a state of the fringes of the structured illuminating lights. Hereinafter, conditions for keeping the state of fringes will be concretely described.

First, a direction of a fast axis of the ½ wavelength plate 19 is required to be set so that a polarization direction of the ±first-order diffractive light fluxes becomes perpendicular to the branching direction of the ±first-order diffractive light fluxes to be selected (any one of the first direction V1 to the third direction V3). Note that the fast axis of the ½ wavelength plate 19 described here indicates a direction in which a phase delay amount when a light polarized in a direction of the axis passes through the ½ wavelength plate 19 is minimized.

Further, an opening pattern of the beam selecting element 20 is formed of a first opening portion 20A and a second opening portion 20B through which one and the other of the ±first-order diffractive light fluxes belonging to the same diffractive light flux group are individually passed, and a length of each of the first opening portion 20A and the second opening portion 20B around the optical axis is set to a length which enables the diffractive light flux linearly polarized in the above-described direction to pass through each of the opening portions. Therefore, a shape of each of the first opening portion 20A and the second opening portion 20B is a shape close to a partial ring-belt shape.

Figure 3A:
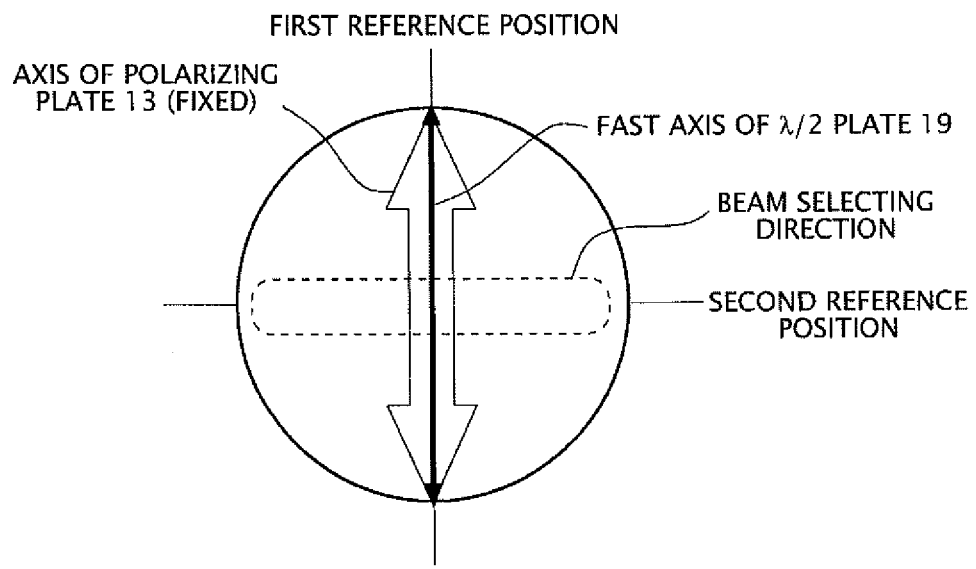
FIG. 3A and FIG. 3B are diagrams each explaining a function of a ½ wavelength plate 19 of a beam selecting section 18.

Here, as illustrated in FIG. 3A, a rotating position of the ½ wavelength plate 19 when the direction of the fast axis of the ½ wavelength plate 19 becomes parallel to a direction of axis of the polarizing plate 13, is set to a reference of the rotating position of the ½ wavelength plate 19 (referred to as "first reference position", hereinafter).

Further, a rotating position of the beam selecting element 20 when a beam selecting direction a branching direction of the ±first-order diffractive light fluxes to be selected) of the beam selecting element 20 becomes perpendicular to the direction of axis of the polarizing plate 13, is set to a reference of the rotating position of the beam selecting element 20 (referred to as "second reference position", hereinafter).

Figure 3B:
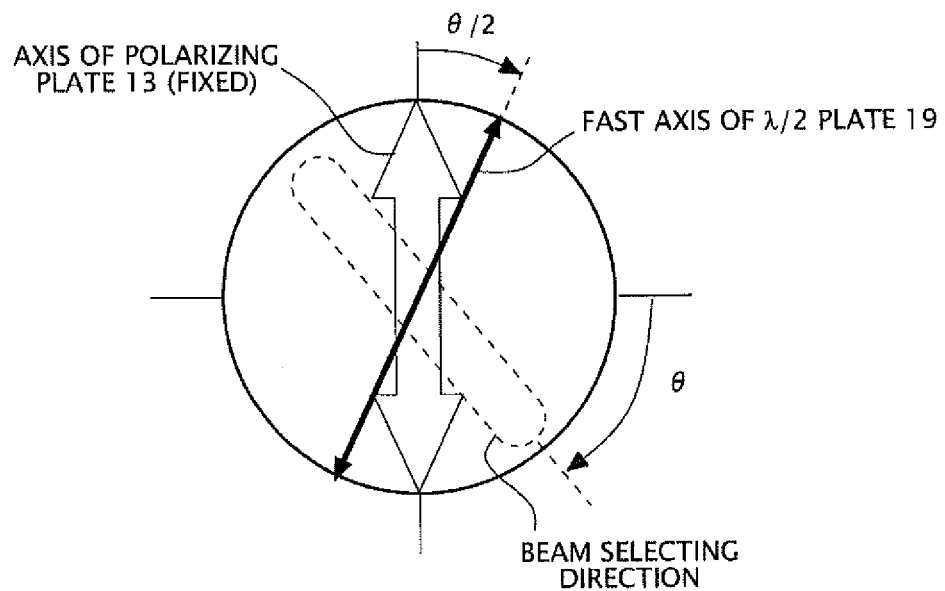

At this time, a rotation amount of the ½ wavelength plate 19 from the first reference position should be controlled to be half of a rotation amount of the beam selecting element 20 from the second reference position, as illustrated in FIG. 3B.

Specifically, when the rotation amount of the ½ wavelength plate 19 from the first reference position is θ/2, the rotation amount of the beam selecting element 20 from the second reference position is set to θ.

Figure 4A:
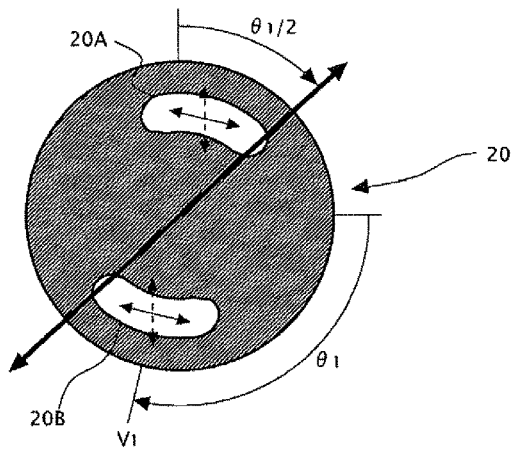
FIG. 4A, FIG. 4B, and FIG. 4C are diagrams each explaining a function of a beam selecting element 20 of the beam selecting section 18.

Accordingly, when the rotating mechanism 18A of the beam selecting section 18 rotates the beam selecting direction of the beam selecting element 20 in the right direction from the second reference position by a rotation angle θ1, as illustrated in FIG. 4A, to select the ±first-order diffractive light fluxes of the first diffractive light flux group (the branching direction is the first direction V1), the rotating mechanism 18A rotates the direction of the fast axis of the ½ wavelength plate 19 in the right direction from the first reference position by a rotation angle θ½.

At this time, although the polarization directions of the diffractive light fluxes of respective orders before the diffractive light fluxes pass through the ½ wavelength plate 19 are parallel to the direction of axis of the polarizing plate 13, as indicated by dashed bidirectional arrows in FIG. 4A, the polarization directions of the diffractive light fluxes of respective orders after the diffractive light fluxes pass through the ½ wavelength plate 19 are rotated in the right direction by the rotation angle θ1, so that the polarization directions of the selected ±first-order diffractive light fluxes become perpendicular to the branching direction of the ±first-order diffractive light fluxes (the first direction V1), as indicated by solid bidirectional arrows in FIG. 4A.

Figure 4B:
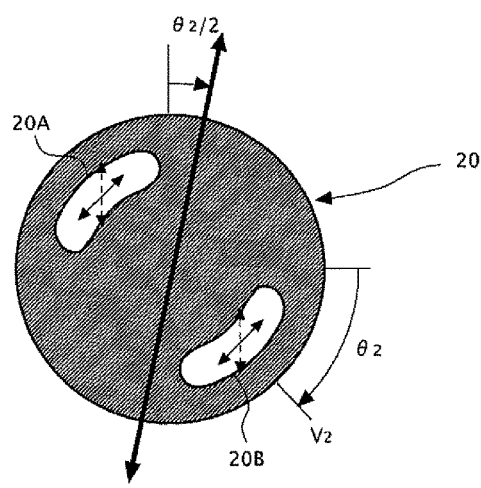

Further, when the rotating mechanism 18A of the beam selecting section 18 rotates the beam selecting direction of the beam selecting element 20 in the right direction from the second reference position by a rotation angle θ2, as illustrated in FIG. 4B, to select the ±first-order diffractive light fluxes of the second diffractive light flux group (the branching direction is the second direction V2), the rotating mechanism 18A rotates the direction of the fast axis of the ½ wavelength plate 19 in the right direction from the first reference position by a rotation angle θ2/2.

At this time, although the polarization directions of the diffractive light fluxes of respective orders before the diffractive light fluxes pass through the ½ wavelength plate 19 are parallel to the direction of axis of the polarizing plate 13, as indicated by dashed bidirectional arrows in FIG. 4B, the polarization directions of the diffractive light fluxes of respective orders after the diffractive light fluxes pass through the ½ wavelength plate 19 are rotated in the right direction by the rotation angle θ2, so that the polarization directions of the selected ±first-order diffractive light fluxes become perpendicular to the branching direction of the ±first-order diffractive light fluxes (the second direction V2), as indicated by solid bidirectional arrows in FIG. 4B.

Figure 4C:
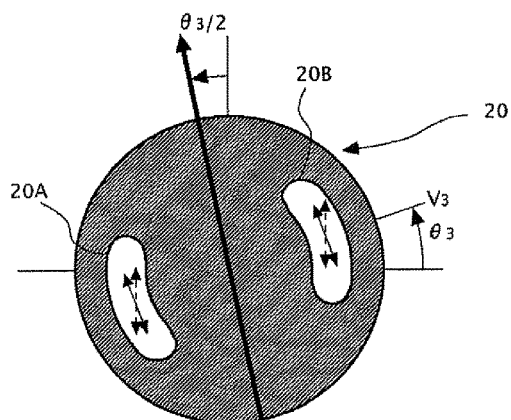

Further, when the rotating mechanism 18A of the beam selecting section 18 rotates the beam selecting direction of the beam selecting element 20 in the left direction (when seen from the sample side, which is similarly applied to the following description) from the second reference position by a rotation angle θ3, as illustrated in FIG. 4C, to select the ±first-order diffractive light fluxes of the third diffractive light flux group (the branching direction is the third direction V3), the rotating mechanism 18A rotates the direction of the fast axis of the ½ wavelength plate 19 in the left direction from the first reference position by a rotation angle θ3/2.

At this time, although the polarization directions of the diffractive light fluxes of respective orders before the diffractive light fluxes pass through the ½ wavelength plate 19 are parallel to the direction of axis of the polarizing plate 13, as indicated by dashed bidirectional arrows in FIG. 4C, the polarization directions of the diffractive light fluxes of respective orders after the diffractive light fluxes pass through the ½ wavelength plate 19 are rotated in the left direction by the rotation angle θ3, so that the polarization directions of the selected ±first-order diffractive light fluxes become perpendicular to the branching direction of the ±first-order diffractive light fluxes (the third direction V3), as indicated by solid bidirectional arrows in FIG. 4C.

Therefore, the rotating mechanism 18A of the beam selecting section 18 is only required to move the ½ wavelength plate 19 and the beam selecting element 20, in a conjunctive manner, at a gear ratio of 2:1.

Figure 5:
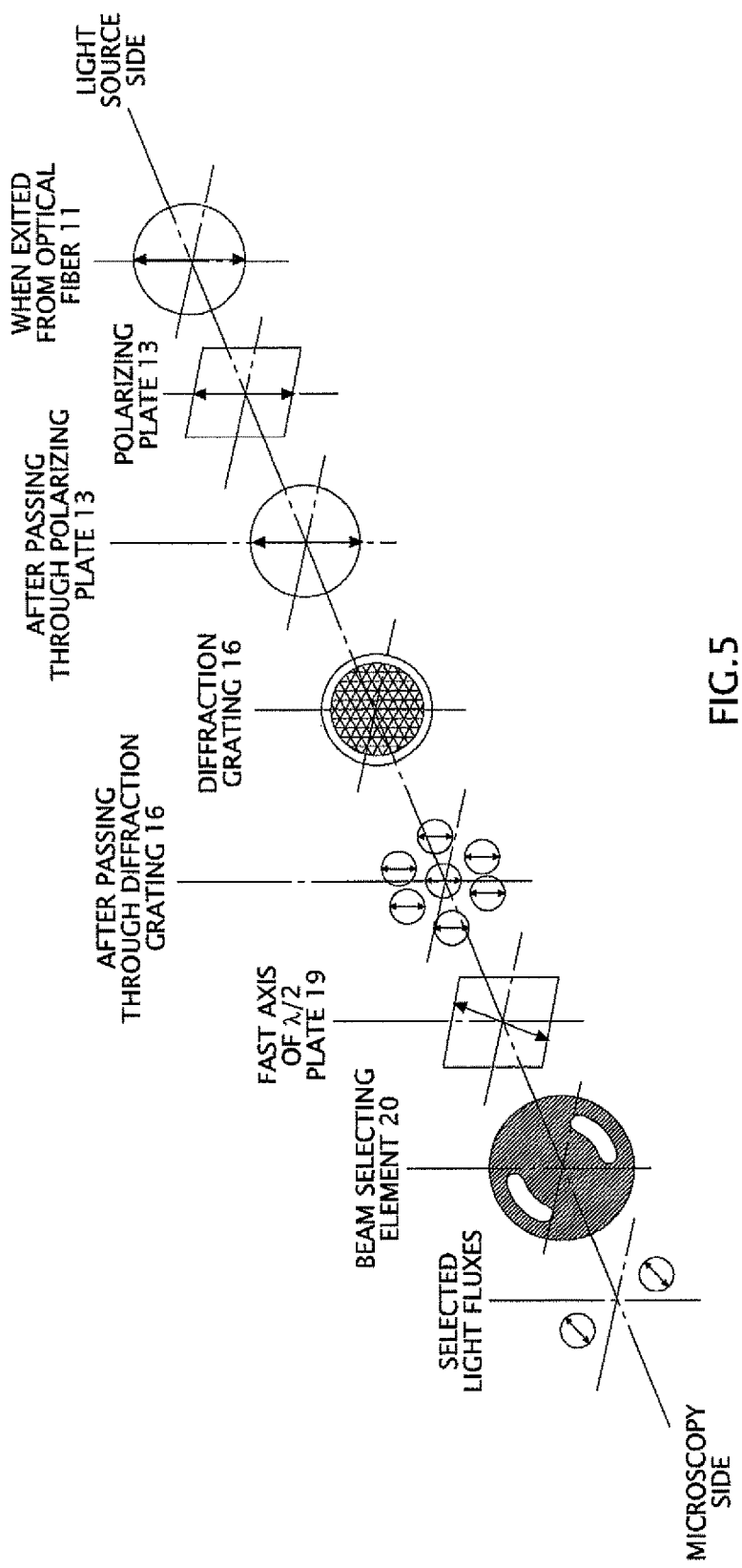
FIG. 5 is a diagram explaining a function of the beam selecting section 18.

FIG. 5 is a diagram explaining the function of the beam selecting section 18 described above. Note that in FIG. 5, bidirectional arrows surrounded by a circular frame indicate a polarization direction of a light flux, and bidirectional arrows surrounded by a quadrangular frame indicate an axial direction of the optical element.

Figure 6:
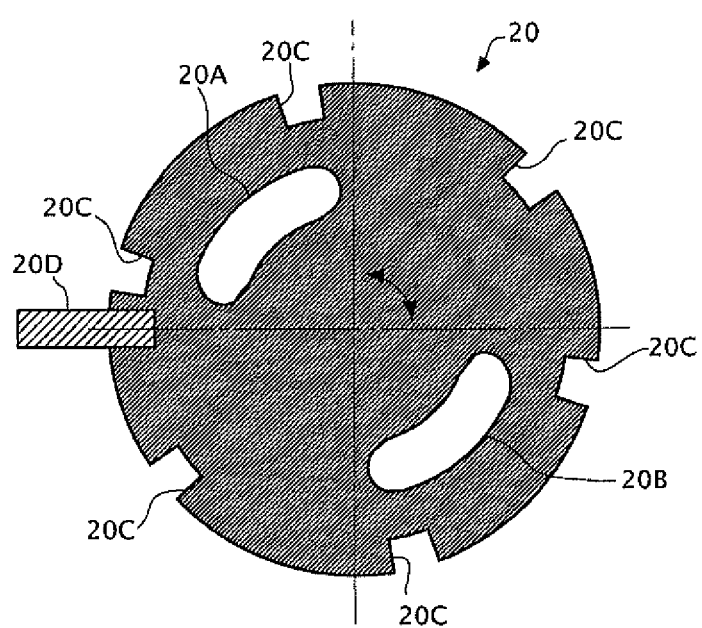
FIG. 6 is a diagram explaining a rotating mechanism 18A of the beam selecting section 18.

Further, as illustrated in FIG. 6, a plurality of (six, in an example illustrated in FIG. 6) cutouts 20C are formed on an outer peripheral portion of the beam selecting element 20, and the rotating mechanism 18A is provided with a timing sensor 20D for detecting the cutouts 20C. Accordingly, the rotating mechanism 18A can detect not only the rotating position of the beam selecting section 18 but also the rotating position of the ½ wavelength plate 19, Next, the translatory shifting mechanism 15 of the beam branching section 14 will be described in detail.

FIG. 7 are diagrams explaining an operation of the translatory shifting mechanism 15 of the beam branching section 14.

First, in order to enable to conduct the demodulating calculation (details thereof will be described later), at least two modulated images in which directions of interference fringes are common and phases are different, being modulated images related to the same sample 2, are required. This is because in a modulated image generated by the structured illuminating microscopy apparatus 1, a 0th-order modulating component, a +first-order modulating component, and a −first-order modulating component being information of structure in which a spatial frequency is modulated by the structured illuminating lights, out of a structure of the sample 2 are superimposed, and there is a need to make the mutually superimposed three unknown parameters to be known in the demodulating calculation (details thereof will be described later).

Figure 7A:
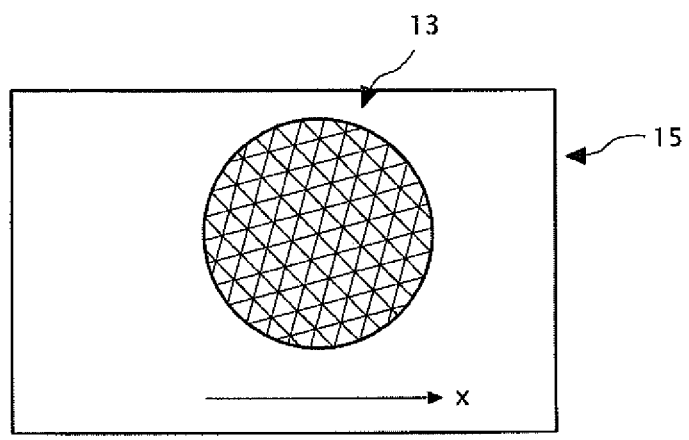
FIG. 7A and FIG. 7B are diagrams each explaining an operation of a translatory shifting mechanism 15 of the beam branching section 14.

Accordingly, in order to shift the phase of the interference fringes, the translatory shifting mechanism 15 of the beam branching section 14 shifts the diffraction grating 16 along a direction which is perpendicular to the optical axis of the illuminating optical system 10, and which is not perpendicular to all of the aforementioned first direction V1, second direction V2, and third direction V3 (x direction), as illustrated in FIG. 7A.

Note that a shift amount L of the diffraction grating 16 required to shift the phase of the interference fringes by a desired shift amount $\phi$ is not always the same when the beam selecting direction selected by the beam selecting section 18 is the first direction V1, when the direction is the second direction V2, and when the direction is the third direction V3.

Figure 7B:
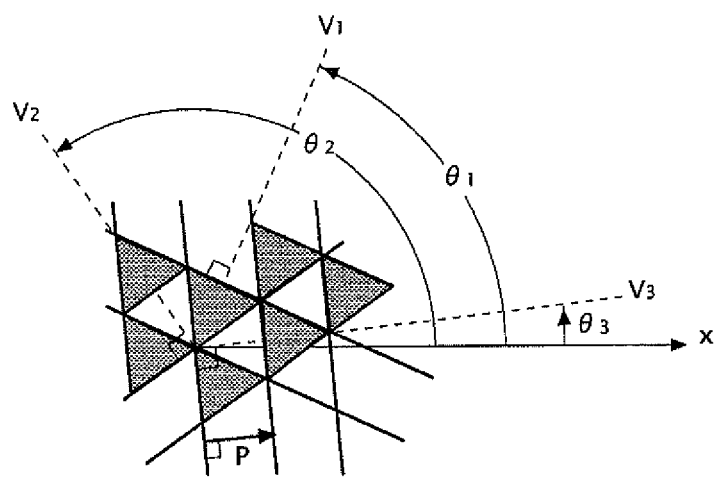

As illustrated in FIG. 7B, if a structural pitch (pitch) in each of the first direction V1, the second direction V2, and the third direction V3 of the diffraction grating 16 is set to P, an angle made by a shift direction of the diffraction grating 16 (x direction) and the first direction V1 is set to $\theta 1$, an angle made by the shift direction of the diffraction grating 16 (x direction) and the second direction V2 is set to $\theta 2$, and an angle made by the shift direction of the diffraction grating 16 (x direction) and the third direction V3 is set to $\theta 3$, a shift amount L1 in the x direction of the diffraction grating 16 required when the beam selecting direction is the first direction V1 is represented by $L1=\phi \times P/(4\pi \times |\cos \theta 1|)$, a shift amount L2 in the x direction of the diffraction grating 16 required when the beam selecting direction is the second direction V2 is represented by $L2=\phi \times P/(4\pi \times |\cos \theta 2|)$, and a shift amount L3 in the x direction of the diffraction grating 16 required when the beam selecting direction is the third direction V3 is represented by $L3=\phi \times P/(4\pi \times |\cos \theta 3|)$.

Specifically, the shift amount L in the x direction of the diffraction grating 16 required to set the phase shift amount of the interference fringes to have the desired value $\phi$ is represented, as in an expression (1), by the angle $\theta$ made by the wavelength selecting direction (any one of the first direction V1, the second direction V2, and the third direction V3) and the x direction.

$$L=\phi \times P/(4\pi \times |\cos \theta|) \quad (1)$$

Incidentally, a shift amount L in the x direction of the diffraction grating 16 required to set the phase shift amount $\phi$ of the interference fringes to $2\pi$ is represented by $P/(2\times |\cos \theta|)$. This is an amount corresponding to a half pitch of the diffraction grating 16. Specifically, only by shifting the diffraction grating 16 by a half pitch, the phase of the structured illuminating light can be shifted by one pitch (this is because a fringe pitch of the interference fringes formed of the ±first-order diffractive lights corresponds to twice the structural pitch of the diffraction grating 16).

[Basic Operation of Image Storing-Calculating Device 44]

The above-described image storing-calculating device 44 is formed of a computer which performs calculation by executing a program for calculation, an operation circuit which performs calculation processing, or a combination of both of the computer and the operation circuit. Further, the computer may be a general-purpose computer on which the program for calculation is installed via a storage medium or a communication network.

Hereinafter, a basic procedure of the demodulating calculation performed by the image storing-calculating device 44 will be described. The basic procedure includes the following four steps.

First step: Each of a plurality of modulated images is subjected to Fourier transform, to thereby generate a plurality of spatial frequency spectra.

Second step: A 0th-order modulating component of fluorescence, a +first-order modulating component of fluorescence, and a −first-order modulating component of fluorescence superimposed on each of the spatial frequency spectra are separated from one another on a Fourier space.

Third step: The mutually separated 0th-order modulating component of fluorescence, +first-order modulating component of fluorescence, and −first-order modulating component of fluorescence are arranged again on the Fourier space, to thereby generate a spatial frequency spectrum of a demodulated image.

Fourth step: The spatial frequency spectrum of the demodulated image is subjected to inverse Fourier transform, to thereby acquire the demodulated image (=super-resolved image).

Note that at least two of these steps may be collectively executed by using one arithmetic expression.

[2D/3D Switching]

Hereinafter, explanation will be made on a 2D/3D switching of the structured illuminating microscopy apparatus described above.

In the above explanation, the interference fringes projected onto the sample 2 are set to two-beam interference fringes (specifically, the example of using the structured illuminating microscopy apparatus 1 in the 2D-SIM mode is explained), but, it is also possible to set the interference fringes projected onto the sample 2 to three-beam interference fringes (specifically, to use the structured illuminating microscopy apparatus 1 in the 3D-SIM mode).

Figure 8:
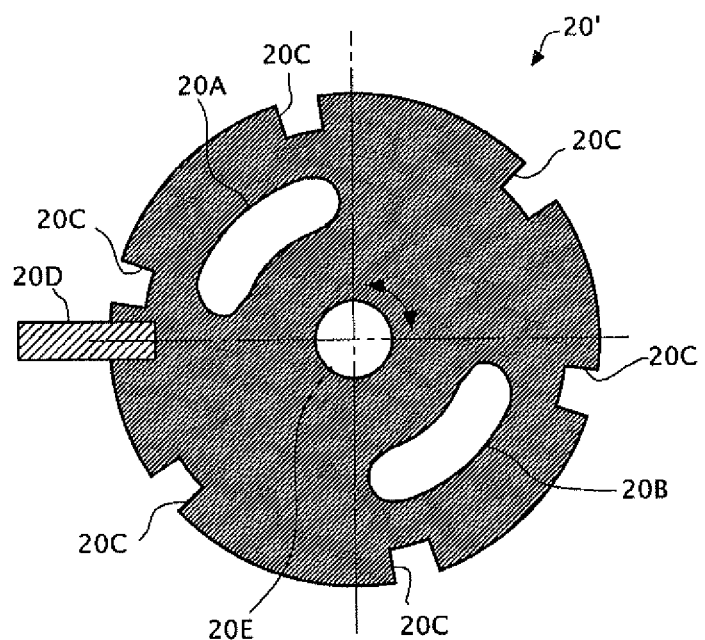
FIG. 8 is a diagram explaining a beam selecting element 20' for a 3D-SIM mode.

In the 3D-SIM mode, a beam selecting element 20' as illustrated in FIG. 8 is used, instead of using the beam selecting element 20 illustrated in FIG. 6. The beam selecting element 20' corresponds to the beam selecting element 20 illustrated in FIG. 6 in which an opening portion 20E through which the 0th-order diffractive light flux passes is provided. Note that a place of formation of the opening portion 20E is in the vicinity of the optical axis, and a shape of the opening portion 20E is a circular shape, for example. With the use of such a beam selecting element 20', it is possible to make not only the ±first-order diffractive light fluxes but also the 0th-order diffractive light flux contribute to the interference fringes.

As described above, the interference fringes generated by the interference of three diffractive light fluxes (three-beam interference) are spatially-modulated not only in the surface direction of the sample 2 but also in the depth direction of the sample 2. Therefore, with the use of the interference fringes, it is possible to obtain the super-resolution effect also in the depth direction of the sample 2.

Note that between the 2D-SIM mode and the 3D-SIM mode, the contents of the demodulating calculation to be executed by the image storing-calculating device 44 are different. This is because, although the three components being the 0th-order modulating component of fluorescence, the +first-order modulating component of fluorescence, and the −first-order modulating component of fluorescence are superimposed on the modulated image generated in the 2D-SIM mode, five components being the 0th-order modulating component of fluorescence, the +first-order modulating component of fluorescence, the −first-order modulating component of fluorescence, a +second-order modulating component of fluorescence, and a −second-order modulating component of fluorescence are superimposed on the modulated image generated in the 3D-SIM mode.

Further, since the number of modulating components superimposed on the modulated image are different between the 2D-SIM mode and the 3D-SIM mode, the number of frames of the modulated images to be acquired by the controlling device 43 and the like are also different. Detailed explanation will be given hereinafter.

[Section 1.1 (Prerequisite of 2D-SIM)]

In this Section, a prerequisite of the 2D-SIM will be described.

Here, an interference fringe intensity distribution in the 2D-SIM mode is defined as follows.

A fluorescent material density of a sample is set to $I_0(x)$, and an interference fringe intensity distribution on a sample plane is set to $K(x)$. Further, it is assumed that a fluorescence generated in the sample is in proportion to an illumination intensity. In this case, a fluorescence intensity distribution $I_{fl}(x)$ is represented as follows.

$$I_{fl}(x)=I_0(x)K(x) \qquad (1.1)$$

Further, a fluorescence generated at each point of the sample is incoherent, so that an image as a result of capturing the fluorescence intensity distribution $I_{fl}(x)$ using an objective lens, namely, a modulated image $I(x)$ is represented as follows by an expression of incoherent image formation.

$$I(x)=\iint dx'dy' \text{PSF}(x-x')I_{fl}(x') \qquad (1.2)$$

Hereinafter, the Fourier transform of each function is represented as follows.

$$\tilde{I}(\xi)=\mathcal{F}[I(x)](\xi)$$

In this case, a result of representing the modulated image on a Fourier space (namely, a spatial frequency spectrum of the modulated image) is represented as follows.

$$\tilde{I}(\xi)=\text{OTF}(\xi)\tilde{I}_{fl}(\xi) \qquad (1.3)$$

Since OTF becomes zero under a condition of $|\xi|>2NA$, the spatial frequency spectrum of the modulated image also becomes zero under the condition of $|\xi|>2NA$. Note that the following relationship is used in this case.

$$\text{OTF}(\xi)=\mathcal{F}[\text{PSF}(x)]$$

Further, the fluorescence intensity distribution on the Fourier space is represented as follows.

$$\tilde{I}_{fl}(\xi)=\iint d\xi' d\eta\, \tilde{I}_o(\xi-\xi')\tilde{K}(\xi') \qquad (1.4))$$

Hereinafter, a coefficient which is not necessary in the explanation of the demodulating calculation will be ignored.

[Section 1.2 (Conventional 2D-SIM)]

In this Section, a demodulating calculation of the conventional 2D-SIM will be described for comparison.

First, an interference fringe intensity distribution of the 2D-SIM is represented as follows (fringes have a sinusoidal intensity distribution).

$$K(x) = 1 + \cos\left(\frac{2\pi}{\lambda}\xi_0 \cdot x - \phi\right) \qquad (1.5)$$

Note that $\xi_0$ indicates a spatial frequency (modulation frequency) of the interference fringes.

Therefore, the interference fringe intensity on the Fourier space is represented as follows.

$$\tilde{K}(\xi) = \delta(\xi) + \frac{\delta(\xi-\xi_0)e^{-i\phi} + \delta(\xi+\xi_0)e^{i\phi}}{2} \qquad (1.6)$$

Note that $\xi$ indicates a coordinate on the Fourier space.

According to this expression 1.6, the expression 1.3, and the expression 1.4, it can be understood that the modulated image on the Fourier space is represented as follows.

$$\tilde{I}(\xi) = OTF(\xi)\left(\frac{1}{2}e^{-i\phi}\tilde{I}_o(\xi-\xi_0) + \tilde{I}_o(\xi) + \frac{1}{2}e^{i\phi}\tilde{I}_o(\xi-\xi_0)\right) \qquad (1.7)$$

Hereinafter, the spatial frequency spectrum on the Fourier space is simply referred to as "spectrum". Further, to a modulated image acquired when a phase of the interference fringes is $\phi_i$, a subscript "$\phi_i$" corresponding to the image is attached.

Figure 9:
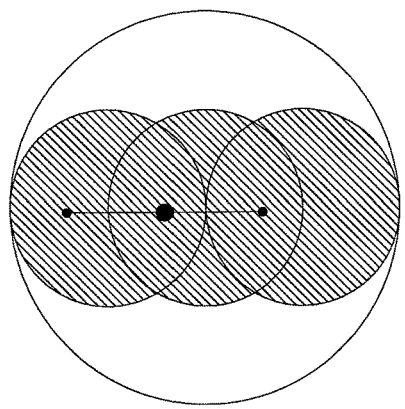
FIG. 9 is a diagram explaining a demodulating calculation in a conventional 2D-SIM mode.

Here, as described above, on the observation point $\xi$ in the spectrum of the modulated image acquired in the 2D-SIM, the three components being the –first-order modulating component of fluorescence, the +first-order modulating component of fluorescence, and the 0th-order modulating component of fluorescence, are superimposed. Three terms in the right side of the expression 1.7 correspond to the respective modulating components. Specifically, since the sample (fluorescence) is spatially modulated by the fringes having the sinusoidal intensity distribution, the spectrum of the modulated image can be represented by the three modulating components (the 0th-order modulating component and the ±first-order modulating components) of fluorescence. The +first-order modulating component superimposed on the observation point $\xi$ is a value (restoration value) which should be possessed by a restoration point ($\xi-\xi_0$) in a spectrum of a demodulated image, the –first-order modulating component superimposed on the observation point $\xi$ is a value (restoration value) which should be possessed by a restoration point ($\xi+\xi_0$) in the spectrum of the demodulated image, and the 0th-order modulating component superimposed on the observation point $\xi$ is a value (restoration value) which should be possessed by a restoration point $\xi$ in the spectrum of the demodulated image. This applies to each observation point in the spectrum of the modulated image. One large black point in FIG. 9 corresponds to a certain observation point, and the large black point and two small black points on both sides of the large black point correspond to three restoration points restored from the observation point.

Accordingly, in the demodulating calculation of the conventional 2D-SIM, in order to make the three modulating components superimposed on each observation point in the spectrum of the modulated image to be separated from one another, three modulated images with different phases of fringes have been acquired to generate spectra of the respective modulated images, and the spectra have been applied to three expressions (the following expression 1.8, expression 1.9, and expression 1.10), to thereby obtain three equations. Conventionally, by solving the three equations, restoration values of a painted-out area (normal resolution range and super-resolution range) in FIG. 9 have been determined.

$$\tilde{I}_{\phi1}(\xi) = OTF(\xi)\left(\frac{1}{2}e^{-i\phi_1}\tilde{I}_o(\xi-\xi_0) + \tilde{I}_o(\xi) + \frac{1}{2}e^{i\phi_1}\tilde{I}_o(\xi+\xi_0)\right) \qquad (1.8)$$

$$\tilde{I}_{\phi2}(\xi) = OTF(\xi)\left(\frac{1}{2}e^{-i\phi_2}\tilde{I}_o(\xi-\xi_0) + \tilde{I}_o(\xi) + \frac{1}{2}e^{i\phi_2}\tilde{I}_o(\xi+\xi_0)\right) \qquad (1.9)$$

$$\tilde{I}_{\phi3}(\xi) = OTF(\xi)\left(\frac{1}{2}e^{-i\phi_3}\tilde{I}_o(\xi-\xi_0) + \tilde{I}_o(\xi) + \frac{1}{2}e^{i\phi_3}\tilde{I}_o(\xi+\xi_0)\right) \qquad (1.10)$$

Incidentally, when it is described that τ=OTF (ξ) for simplification, the expression 1.8, the expression 1.9, and the expression 1.10 can be rewritten as follows.

$$\begin{bmatrix} \tilde{I}_{\phi 1}(\xi) \\ \tilde{I}_{\phi 2}(\xi) \\ \tilde{I}_{\phi 3}(\xi) \end{bmatrix} = \frac{\tau}{2} \begin{bmatrix} e^{-i\phi_1} & 2 & e^{i\phi_1} \\ e^{-i\phi_2} & 2 & e^{i\phi_2} \\ e^{-i\phi_3} & 2 & e^{i\phi_3} \end{bmatrix} \begin{bmatrix} \tilde{I}_o(\xi-\xi_0) \\ \tilde{I}_o(\xi) \\ \tilde{I}_o(\xi+\xi_0) \end{bmatrix} \quad (1.11)$$

Note that when a determinant of a matrix (which is set as M, hereinafter) of this expression is not zero, it is possible to determine, from three observation values (left side) of a certain observation point in a spectrum of each of three modulated images, restoration values (right side) of three restoration points corresponding to the observation points.

Here, the spatial frequency (modulation frequency) $\xi_0$ of the fringes in the conventional 2D-SIM is set so that $|\xi_0|<2NA$ is satisfied, and it is possible to determine a restoration value of a restoration point which satisfies $|\xi \pm \xi_0|>2NA$ by an observation value obtained from a normal resolution area in which $|\xi|<2NA$ is satisfied. Accordingly, in the conventional 2D-SIM, it is possible to restore a restoration value of an area outside of the normal resolution area (super-resolution area), namely, it is possible to obtain a super-resolved image as a demodulated image.

Note that the above-described matrix M does not depend on ξ. Specifically, the above-described matrix M does not depend on the coordinate (=spatial frequency) on the Fourier space. Accordingly, when a condition number of the matrix M is plotted by setting the phase $\phi_i$ as a parameter, a result as illustrated in FIG. 10 is obtained.

Figure 10:
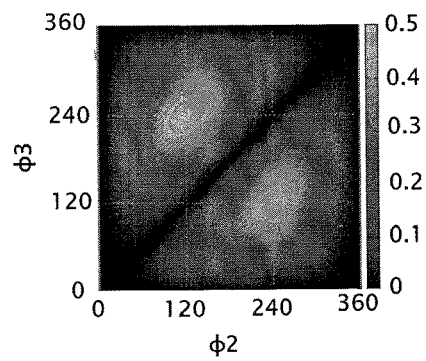
FIG. 10 illustrates a distribution of a reciprocal of condition number of a matrix M used in the conventional 2D-SIM.

FIG. 10 illustrates a distribution of a reciprocal of the condition number of the matrix M. Note that in this case, a phase $\phi_1$ of a first modulated image is set to 0°, and each of a phase $\phi_2$ of a second modulated image and a phase $\phi_3$ of a third modulated image is set to a variable. A horizontal axis in FIG. 10 indicates $\phi_2$, and a vertical axis in FIG. 10 indicates $\phi_3$.

From FIG. 10, it can be understood that when $\phi_2$ equals to 120° and $\phi_3$ equals to 240°, the reciprocal of the condition number takes the maximum value of 0.5, and thus the best condition is provided. For this reason, the conventional 2D-SIM generally sets a phase contrast among three frames to 120°.

[Section 1.3 (Two-Image-Two-Point Restoration in 2D-SIM)]

In this Section, "two-image-two-point restoration" will be described as a demodulating calculation in the 2D-SIM of the present embodiment. It is set that the acquirement of modulated images in this Section is performed when the aforementioned controlling device 43 controls the respective parts, and the calculation in this Section is executed by the aforementioned image storing-calculating device 44 (which similarly applies to the other Sections).

This Section focuses attention on the fact that, in a spectrum of one piece of modulated image acquired by the 2D-SIM, modulating components with mutually common values are superimposed on two observation points ξ and (ξ+ξ$_0$) which are separated by a modulation frequency ξ$_0$ in a modulating direction.

Concretely, each of a −first-order modulating component of fluorescence superimposed on the observation point ξ and a 0th-order modulating component of fluorescence superimposed on the observation point (ξ+ξ$_0$) corresponds to a restoration value of a restoration point (ξ+ξ$_0$), each of a +first-order modulating component of fluorescence superimposed on the observation point (ξ+ξ$_0$) and a 0th-order modulating component of fluorescence superimposed on the observation point ξ corresponds to a restoration value of a restoration point ξ. Specifically, the two observation points ξ and (ξ+ξ$_0$) include the mutually common restoration values of the two restoration points ξ and (ξ+ξ$_0$). The two-image-two-point restoration in this Section utilizes this relationship. Concrete description will be made hereinafter.

First, if it is assumed that the interference fringe intensity distribution is set in a similar manner to that of the conventional 2D-SIM, a range of observation of the spectrum of the modulated image is represented by $|\xi|<2NA$, by using NA of the objective lens.

The spatial frequency (modulation frequency) ξ$_0$ of the fringes in this Section is set so that $|\xi_0|<2NA$ is satisfied. Note that the spatial frequency (modulation frequency) ξ$_0$ of the fringes is set by a grating pitch of the diffraction grating 16 (fringe pitch formed on the sample).

In this case, it is possible to obtain observation values at two observation points ξ and (ξ+ξ$_0$) which are separated by ξ$_0$, from a spectrum of one piece of modulated image. Note that a range capable of obtaining the observation value at (ξ+ξ$_0$) is limited to a range in which ξ satisfies a condition of $|\xi+\xi_0|<2NA$.

Here, the observation value at the observation point ξ and the observation value at the observation point (ξ+ξ$_0$) in the spectrum of the one piece of modulated image are represented by the following expression.

$$\tilde{I}_\phi(\xi) = OTF(\xi)\left(\frac{1}{2}e^{-i\phi}\tilde{I}_o(\xi-\xi_0) + \tilde{I}_o(\xi) + \frac{1}{2}e^{i\phi}\tilde{I}_o(\xi+\xi_0)\right) \quad (1.12)$$

$$\tilde{I}_\phi(\xi+\xi_0) = OTF(\xi+\xi_0)\left(\frac{1}{2}e^{-i\phi}\tilde{I}_o(\xi) + \tilde{I}_o(\xi+\xi_0) + \frac{1}{2}e^{i\phi}\tilde{I}_o(\xi+2\xi_0)\right) \quad (1.13)$$

In the right side of the expression 1.12 and the expression 1.13, restoration values (unknowns) of four restoration points appear. In order to make these four restoration values to be known, two more expressions are necessary.

Accordingly, in this Section, a spectrum of each of two modulated images whose phases φ are mutually different is generated, four observation values, in total, regarding two observation points ξ and (ξ+ξ$_0$) are referred to from the respective two spectra, and the four observation values are applied to the expression 1.12 and the expression 1.13, to thereby obtain four expressions, in total, including four restoration values (unknowns).

Here, when it is set that $\tau_1$=OTF(ξ), $\tau_2$=OTF(ξ+ξ$_0$), the phase φ of the first modulated image is $\phi_1$, and the phase φ of the second modulated image is $\phi_2$, for simplification, the four expressions can be represented by the following matrix.

$$\begin{bmatrix} \tilde{I}_{\phi 1}(\xi) \\ \tilde{I}_{\phi 1}(\xi+\xi_0) \\ \tilde{I}_{\phi 2}(\xi) \\ \tilde{I}_{\phi 2}(\xi+\xi_0) \end{bmatrix} = \quad (1.14)$$

$$\frac{1}{2}\begin{bmatrix} \tau_1 e^{-i\phi_1} & 2\tau_1 & \tau_1 e^{i\phi_1} & 0 \\ 0 & \tau_2 e^{-i\phi_1} & 2\tau_2 & \tau_2 e^{i\phi_1} \\ \tau_1 e^{-i\phi_2} & 2\tau_1 & \tau_1 e^{i\phi_2} & 0 \\ 0 & \tau_2 e^{-i\phi_2} & 2\tau_2 & \tau_2 e^{i\phi_2} \end{bmatrix}\begin{bmatrix} \tilde{I}_o(\xi-\xi_0) \\ \tilde{I}_o(\xi) \\ \tilde{I}_o(\xi+\xi_0) \\ \tilde{I}_o(\xi+2\xi_0) \end{bmatrix}$$

Accordingly, in this Section, when a determinant of the matrix (which is set as M, hereinafter) is not zero, it is possible to determine the four restoration values (right side) from the four observation values (left side) in the spectra of the two pieces of modulated images.

Figure 11:
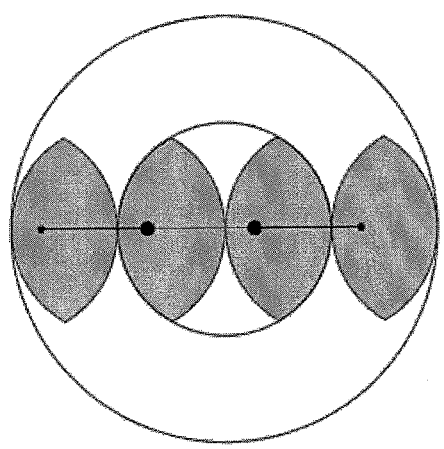
FIG. 11 is a diagram explaining a demodulating calculation in Section 1.3.

Here, out of two circular frames in FIG. 11, the circular frame on the inside indicates an outer edge of the normal resolution range ($|\xi|=2NA$). Further, the circular frame on the outside indicates an outer edge of the super-resolution range ($|\xi|=4NA$).

Two large black points in FIG. 11 indicate two certain observation points displaced by an amount of the spatial frequency (modulation frequency) $\xi_0$ of the fringes, and the two large black points and two small black points in FIG. 11 indicate four restoration points restored from the two observation points.

In this Section, the spectra of the two pieces of modulated images in which the phases of the interference fringes are different are obtained, so that from the two observation points in each of the two spectra, the four observation values, in total, are obtained. Further, by applying the four observation values to the aforementioned expression 1.14, the restoration values of the respective four restoration points are determined.

Further, in this Section, by repeatedly calculating four restoration values while moving two observation points within the normal resolution range, restoration values of the entire painted-out area in FIG. 11 are determined.

Therefore, in this Section, regardless of the fact that the number of pieces of acquired modulated images (the number of generated spectra) is only two, it is possible to determine at least a part of restoration values in the normal resolution range and at least a part of restoration values in the super-resolution range.

[Section 1.3.1 (Restoration Capable Condition)]

In this Section, a necessary condition for the demodulating calculation in Section 1.3 will be described.

In order to make the above-described expression 1.14 have a unique solution, it is only required that the determinant of the matrix M takes a value other than zero. Here, the determinant of the matrix M is represented as follows.

$$detM = \begin{vmatrix} \tau_1 e^{-i\phi_1} & 2\tau_1 & \tau_1 e^{i\phi_1} & 0 \\ 0 & \tau_2 e^{-i\phi_1} & 2\tau_2 & \tau_2 e^{i\phi_1} \\ \tau_1 e^{-i\phi_2} & 2\tau_1 & \tau_1 e^{i\phi_2} & 0 \\ 0 & \tau_2 e^{-i\phi_2} & 2\tau_2 & \tau_2 e^{i\phi_2} \end{vmatrix} \quad (1.15)$$

$$= \tau_1^2 \tau_2^2 \begin{vmatrix} e^{-i\phi_1} & 2 & e^{i\phi_1} & 0 \\ 0 & e^{-i\phi_1} & 2 & e^{i\phi_1} \\ e^{-i\phi_2} & 2 & e^{i\phi_2} & 0 \\ 0 & e^{-i\phi_2} & 2 & e^{i\phi_2} \end{vmatrix} \quad (1.16)$$

$$= 4\tau_1^2 \tau_2^2 (\cos(\phi_1 - \phi_2) - 1)^2 \quad (1.17)$$

Therefore, as long as a phase contrast $\Delta\phi$ between the phase $\phi_1$ of the first modulated image and the phase $\phi_2$ of the second modulated image satisfies a condition of $\Delta\phi\cdot 0$, a condition of $detM \neq 0$ is satisfied, and the expression 1.14 has a unique solution. As a result of the above, it can be understood that the necessary condition for the demodulating calculation in Section 1.3 is the condition of $\Delta\phi \neq 0$.

[Section 1.3.4 (Characteristic of Condition of $\Delta\phi=\pi$)]

In this Section, a characteristic of a condition of $\Delta\phi=\pi$ will be described.

When the condition of $\Delta\phi=\pi$ it is satisfied, the following expression is satisfied.

$$\tilde{I}_{\phi1}(\xi) = \frac{\tau_1}{2}(\tilde{I}_o(\xi-\xi_0) + 2\tilde{I}_o(\xi) + \tilde{I}_o(\xi+\xi_0)) \quad (1.21)$$

$$\tilde{I}_{\phi2}(\xi) = \frac{\tau_1}{2}(-\tilde{I}_o(\xi-\xi_0) + 2\tilde{I}_o(\xi) - \tilde{I}_o(\xi+\xi_0)) \quad (1.22)$$

In this case, the phases multiplied with respect to the following expression become equal.

$\tilde{I}_o(\xi-\xi_0), \tilde{I}_o(\xi+\xi_0)$

Accordingly, $I_o(\xi)$ can be easily solved, and the following expression is satisfied.

$$\tilde{I}_o(\xi) = \frac{1}{2\tau_1}(\tilde{I}_{\phi1}(\xi) + \tilde{I}_{\phi2}(\xi)) \quad (1.23)$$

Therefore, if the condition of $\Delta\phi=\pi$ it is set to be satisfied, it is possible to eliminate an area which cannot be restored in the normal resolution area.

Figure 12A:
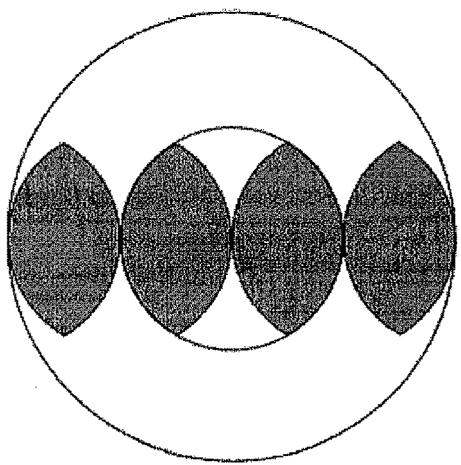
FIG. 12A illustrates a range capable of being restored under a condition of $\Delta\phi \neq \pi$.
Figure 12B:
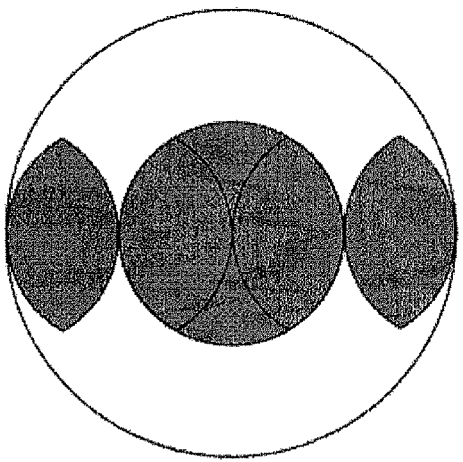
FIG. 12B illustrates a range capable of being restored under a condition of $\Delta\phi = \pi$.

Although a painted-out area in FIG. 12A indicates a range capable of being restored under a condition of $\Delta\phi=\pi$, a painted-out area in FIG. 12B indicates a range capable of being restored under a condition of $\Delta\phi=\pi$ (when $|\xi_0|=2NA$ is satisfied, in both of the above cases). Out of two circles in each of FIG. 12, the circle on the inside indicates an outer edge of the normal resolution range ($|\xi|=2NA$), and the circle on the outside indicates an outer edge of the super-resolution range ($|\xi|=4NA$).

Figure 13:
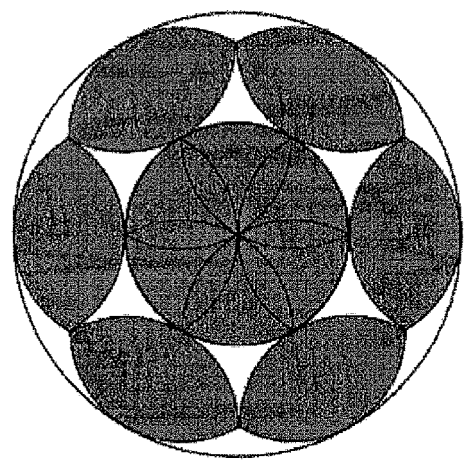
FIG. 13 illustrates a range capable of being restored when a number of directions of interference fringes is set to three in Section 1.3.

Note that here, although the number of direction of the interference fringes is assumed to be one, if the number of directions of the interference fringes is set to three, and a demodulating calculation similar to that in Section 1.3 is applied with respect to each direction, it is possible to restore a wide area such as one illustrated in FIG. 13.

[Section 1.4 (Two-Pass Restoration in 2D-SIM)]

In this Section, "Two-pass restoration" will be described as a demodulating calculation in the 2D-SIM of the present embodiment. In the Two-pass restoration, the number of directions of the interference fringes is set to two.

Hereinafter, in order to distinguish a plurality of interference fringes in which directions and pitches are mutually different, the individual interference fringes are represented by wave number vectors. A magnitude of the wave number vector indicates a magnitude of the spatial frequency of the interference fringes, and a direction of the wave number vector indicates the direction of the interference fringes.

In this Section, the following four steps are executed.

First step: Two pieces of modulated images in which wave number vectors are 40, and phases are different are acquired, and spectra of the respective two pieces of modulated images are generated. The respective two pieces of modulated images are represented as follows.

$\{I_{\phi1}{}^{(0)}, I_{\phi2}{}^{(0)}\}$

Figure 14A:
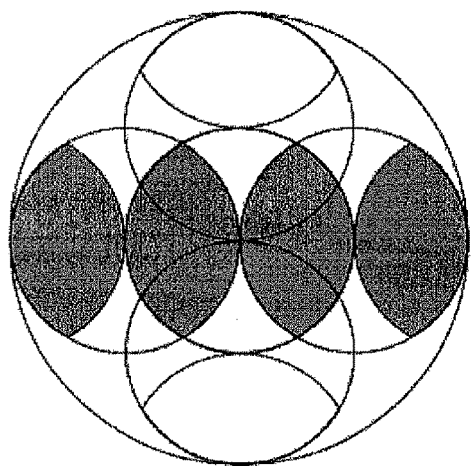
FIG. 14A illustrates an area capable of being restored in a first step in Section 1.4.

Further, by performing a demodulating calculation similar to that in Section 1.3 on the spectra of the respective two pieces of modulated images, restoration values of an area illustrated in FIG. 14A are determined.

Second step: Two pieces of modulated images in which wave number vectors are ti, and phases are different are acquired, and spectra of the respective two pieces of modulated images are generated. The respective two pieces of modulated images are represented as follows.

$$\{I_{\phi_1}^{(1)}, I_{\phi_2}^{(1)}\}$$

Figure 14B:
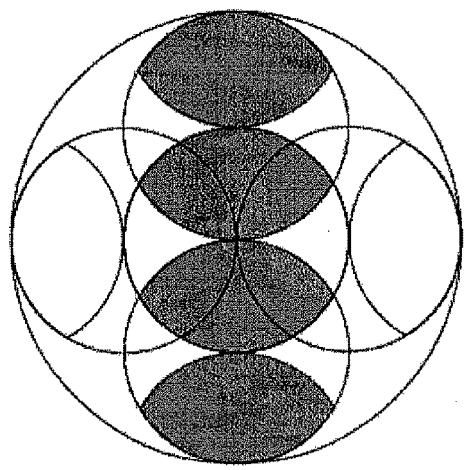
FIG. 14B illustrates an area capable of being restored in a second step.

Further, by performing a demodulating calculation similar to that in Section 1.3 on the spectra of the respective two pieces of modulated images, restoration values of an area illustrated in FIG. 14B are determined.

Third step: Based on the restoration values determined in the above-described steps and the following expression, restoration values of an area illustrated in FIG. 15A are determined.

$$\tilde{I}_{\phi_1}^{(1)}(\xi) = \frac{\tau_1}{2}\left(e^{-i\phi_1}\tilde{I}_o(\xi-\xi_1) + 2\tilde{I}_o(\xi) + e^{i\phi_1}\tilde{I}_o(\xi+\xi_1)\right) \quad (1.24)$$

$$\tilde{I}_{\phi_2}^{(1)}(\xi) = \frac{\tau_1}{2}\left(e^{-i\phi_2}\tilde{I}_o(\xi-\xi_1) + 2\tilde{I}_o(\xi) + e^{i\phi_2}\tilde{I}_o(\xi+\xi_1)\right) \quad (1.25)$$

Figure 15A:
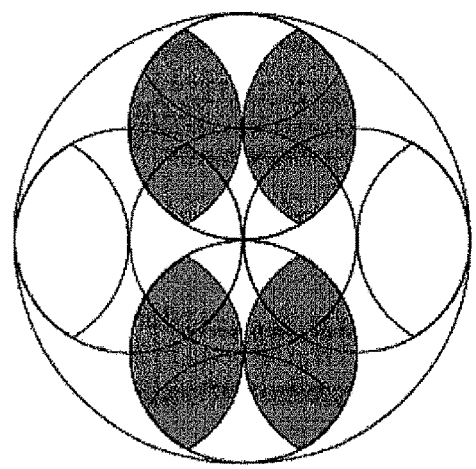
FIG. 15A illustrates an area capable of being restored in a third step in Section 1.4.

Specifically, by applying the restoration values determined in the above-described steps, namely, by applying the following expression to an expression 1.26, the restoration values of the area illustrated in FIG. 15A are determined.

$$\tilde{I}_o(\xi)$$

Note that the expression 1.26 is an expression as a result of solving an expression 1.24 and an expression 1.25 based on the following expression.

$$\tilde{I}_o(\xi-\xi_1), \tilde{I}_o(\xi+\xi_1) \quad (1.26)$$

$$\begin{bmatrix} \tilde{I}_o(\xi-\xi_1) \\ \tilde{I}_o(\xi+\xi_1) \end{bmatrix} = \frac{1}{2i\sin(\phi_1-\phi_2)} \begin{bmatrix} e^{-i\phi_2} & -e^{-i\phi_1} \\ -e^{i\phi_2} & e^{i\phi_1} \end{bmatrix} \begin{bmatrix} \frac{2}{\tau_1}\tilde{I}_{\phi_1}^{(1)}(\xi) - \tilde{I}_o(\xi) \\ \frac{2}{\tau_1}\tilde{I}_{\phi_2}^{(1)}(\xi) - \tilde{I}_o(\xi) \end{bmatrix}$$

Note that in order to enable to conduct the present step, in at least the second step, a condition of $\Delta\phi \neq \pi n$ (n is an integer) is set.

Figure 15B:
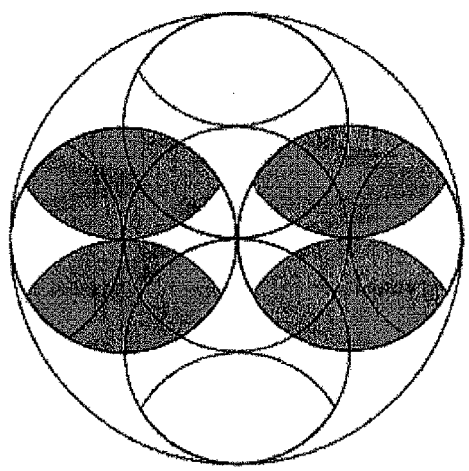
FIG. 15B illustrates an area capable of being restored in a fourth step.

Fourth step: Based on the restoration values in the normal resolution range determined in the second step (a part satisfying the condition of $|\xi|<2NA$, out of the painted-out area in FIG. 14B), restoration values of an area illustrated in FIG. 15B are determined in a similar manner.

Note that in order to enable to conduct the present step, in the first step, the condition of $\Delta\phi \neq \pi n$ (n is an integer) is set.

Figure 16A:
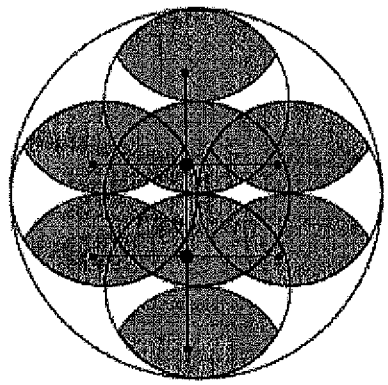
FIG. 16A is a graphical representation of an expression 1.27 in Section 1.4.
Figure 16B:
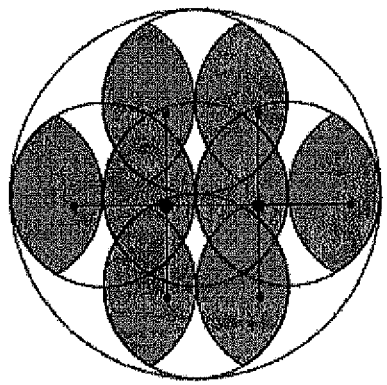
FIG. 16B is a graphical representation of a modified version of the expression 1.27.

The first step and the third step can also be collectively represented as in FIG. 16B. Specifically, four black points lined in a horizontal direction on a horizontal line in FIG. 16B indicate positions on the Fourier space (wave number space) of four restoration values (unknowns) determined by simultaneous equations equivalent to the expression 1.14 solved in the first step.

On each of two vertical lines in FIG. 16B, a large black point at a center among three black points lined in a vertical direction indicates a position, on the Fourier space (wave number space), of one known number determined by the expression in the first step, and small black points on both ends among the three black points indicate positions, on the Fourier space (wave number space), of two restoration values (unknowns) in the simultaneous equations 1.26 solved in the third step.

The mutual positional relationship among the eight black points is the same even if any example is chosen. A range in which the black points can be positioned on the Fourier space (wave number space) is limited by a range in which the two large black points (at the center) can be positioned on the Fourier space (wave number space). The range in which the two large black points can be positioned is represented by $|\xi|<2NA$, so that the range in which the restoration values (unknowns) are positioned, which can be determined through the calculation in the first step and the third step, corresponds to a range of painted-out area in FIG. 16B.

Note that FIG. 16A is a diagram illustrating the second step and the fourth step, in a similar manner to FIG. 16B.

Figure 17:
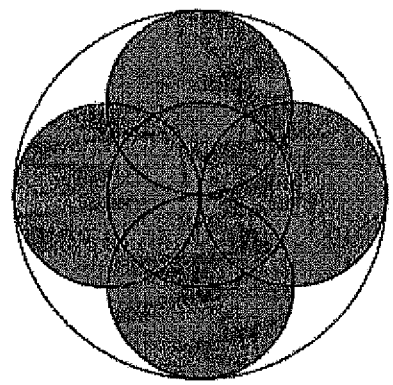
FIG. 17 illustrates a restored area according to a first example in Section 1.5.

Therefore, in this Section, it is possible to restore the entire painted-out area illustrated in FIG. 17.

[Section 1.5 (Example of Super Resolution in 2D-SIM)]

In this Section, two examples of super resolution will be described, based on the results obtained in Sections up to the previous Section.

First, in the first example, the Two-pass restoration is conducted by considering that a suppression of the number of pieces of modulated images (number of spectra) is important. In order to conduct the Two-pass restoration, in the first example, the number of directions of the wave number vectors is set to two, and under each of mutually different two wave number vectors $\xi_1$ and $\xi_2$, two pieces of modulated images with different phases are acquired (four pieces of modulated images, in total, are acquired), and spectra of the respective four pieces of modulated images are generated (four spectra, in total, are generated). Further, in order to enable to conduct the Two-pass restoration, a phase contrast $\Delta\phi$ between the two pieces of modulated images acquired under the same wave number vector is set to $\Delta\phi \neq \pi$. Further, a magnitude of the wave number vector $|\xi_i|$ is set to $|\xi_i|=2NA$ (i=1, 2). In this case, the painted-out area illustrated in FIG. 17 is restored.

Figure 18:
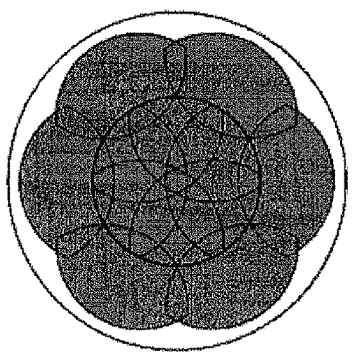
FIG. 18 illustrates a restored area according to a second example in Section 1.5.

Next, in the second example, a calculation accuracy is considered as important, and accordingly, not the Two-pass restoration, but the "two-image-two-point restoration" is conducted. In order to conduct the two-image-two-point restoration, in the second example, the number of directions of the wave number vectors is set to three, and under each of mutually different three wave number vectors $\xi_1$, $\xi_2$, and $\xi_3$, two pieces of modulated images with different phases are acquired (six pieces of modulated images, in total, are acquired), and spectra of the respective six pieces of modulated images are generated (six spectra, in total, are generated). Further, a phase contrast $\Delta\phi$ between the two pieces of modulated images acquired under the same wave number vector is set to $\Delta\phi=\pi$. Further, in order to avoid a generation of gap in a restored area, $|\xi_i|$ is intentionally set to be smaller than 2NA. Concretely, the magnitude $|\xi_i|$ of the wave number vector is set to $|\xi_i|=(\sqrt{3})\times NA$ (i=1, 2) to maximize $|\xi_i|$ within a range of generating no gap in the restored area. In this case, an area illustrated in FIG. 18 is restored.

[Section 1.6 (Four-Image-Three-Point Restoration in 2D-SIM)]

In this Section, "four-image-three-point restoration" in 2D-SIM will be described as a demodulating calculation in the 2D-SIM of the present embodiment.

In this Section, the number of directions of the wave number vectors is set to three (modulated images are acquired under each of three wave number vectors $\xi_1$, $\xi_2$, and $\xi_3$, and spectra of the respective modulated images are generated).

Further, the three wave number vectors $\xi_1$, $\xi_2$, and $\xi_3$ are set to have a closed relationship ($\xi_3=\xi_1-\xi_2$).

Further, in any one direction (wave number vector $\xi_1$) out of the three directions, the phase number is set to two (two pieces of modulated images $I^{(0)}$ and $I^{(1)}$ in which directions of fringes are the same and phases are different are acquired), and in each of the other two directions (wave number vectors $\xi_2$ and $\xi_3$), the phase number is suppressed to one (two pieces of modulated images $I^{(2)}$ and $I^{(3)}$ in which directions of fringes are different are acquired).

Further, a phase contrast $\Delta\phi$ between the two pieces of modulated images in which the directions of fringes are the same is set to $\Delta\phi=\pi$.

Further, in this Section, a magnitude of each wave number vector is set to $|\xi_i|=2NA$ (i=1, 2, 3).

At this time, an interference fringe intensity distribution of each of the four pieces of modulated images $I^{(0)}$, $I^{(1)}$, $I^{(2)}$, and $I^{(3)}$ is represented as follows.

$$K^{(0)} = 1 + \cos\left(\frac{2\pi}{\lambda}\xi_1 \cdot x + \phi_0\right) \quad (1.29)$$

$$K^{(1)} = 1 + \cos\left(\frac{2\pi}{\lambda}\xi_1 \cdot x + \phi_1\right) \quad (1.30)$$

$$K^{(2)} = 1 + \cos\left(\frac{2\pi}{\lambda}\xi_2 \cdot x + \phi_2\right) \quad (1.31)$$

$$K^{(3)} = 1 + \cos\left(\frac{2\pi}{\lambda}(\xi_1 - \xi_2) \cdot x + \phi_3\right) \quad (1.32)$$

Here, in each of spectra of the four pieces of modulated images $I^{(0)}$, $I^{(1)}$, $I^{(2)}$, and $I^{(3)}$, a triangle drawn by the three wave number vectors $\xi_1$, $\xi_2$, and $\xi_3$ is imagined, and an attention is focused on three observation points $\xi$, $(\xi+\xi_1)$, and $(\xi+\xi_2)$ positioned at vertices of the triangle (large black points).

From the three observation points $\xi$, $(\xi+\xi_1)$, and $(\xi+\xi_2)$ in the spectrum of each of the four pieces of modulated images $I^{(0)}$, $I^{(1)}$, $I^{(2)}$, and $I^{(3)}$ acquired in this Section, twelve observation values, in total, are obtained, so that twelve expressions each corresponding to the expression 1.7 corresponding to each of the twelve observation values can be obtained. In this Section, the following condition is required to solve simultaneous equations made of the twelve expressions.

$$\cos(\phi_0-\phi_1)\neq 1 \quad (1.40)$$

$$\cos(\phi_0-\phi_2-\phi_3)\neq\cos(\phi_1-\phi_2-\phi_3) \quad (1.41)$$

FIG. 19 are graphical representations of calculation. Note that it is set that $|\xi_1|=|\xi_2|$, and $\xi_1\cdot\xi_2=|\xi_1\|\xi_2|/2$.

Figure 19A:
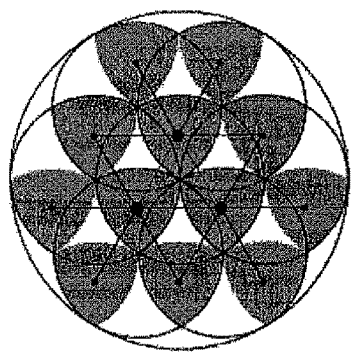
FIG. 19A and FIG. 19B are graphical representations of an expression 1.33 in Section 1.6.

Three large black points in FIG. 19A indicate three observation points positioned at vertices of a triangle drawn by the three wave number vectors $\xi_1$, $\xi_2$, and $\xi_3$ in a spectrum of modulated image, and the three large black points and nine small black points in FIG. 19A indicate restoration points (twelve restoration points, in total) restored from the three observation points.

As described above, since the number of pieces of modulated images (number of spectra) is four in this Section, twelve observation values, in total, are obtained from the three observation points. By creating simultaneous equations of the twelve expressions regarding the twelve observation values and solving the equations, restoration values of twelve restoration points are individually determined.

Further, in this Section, by repeatedly calculating twelve restoration values while moving three observation points, restoration values of the entire painted-out area illustrated in FIG. 19A are determined.

Figure 19B:
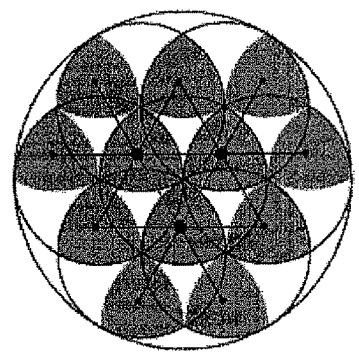

Note that FIG. 19B is a graphical representation when a similar restoration is performed by inverting the direction of the triangle. The restoration in FIG. 19A and the restoration in FIG. 19B can be conducted in a parallel manner. In this Section, the two ways of restorations are conducted, to thereby restore the entire painted-out area illustrated in FIG. 20.

Figure 20:
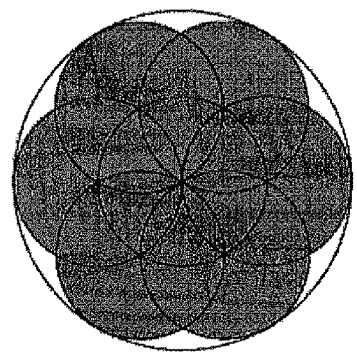
FIG. 20 illustrates an area restored in Section 1.6.

FIG. 20 illustrates a result of synthesizing the restored area illustrated in FIG. 19A and the restored area illustrated in FIG. 19B.

Hereinafter, an example of calculation of solving the simultaneous equations made of the twelve expressions described in this Section will be described in detail.

FIG. 21 are diagrams explaining the calculation in this Section in divided three steps.

FIG. 21A illustrates four restoration points 1 to 4 restored in a first step.

FIG. 21B illustrates four restoration points 5 to 8 restored in a second step.

FIG. 21C illustrates four restoration points 9 to 12 restored in a third step.

FIG. 21D illustrates a correspondence between numbers 1 to 12 in the drawings and restoration values.

First step: Four observation values regarding two observation points 1 and 2 lined in a direction of the wave number vector $\xi_1$ at an interval of $|\xi_1|$, are applied to the expression of the two-image-two-point restoration, to thereby determine restoration values of respective restoration points 1, 2, 3, and 4.

Second step: The restoration values of the respective restoration points 1 and 2 are used to determine restoration values of respective four restoration points 5, 6, 7, and 8, which are displaced from the restoration points 1 and 2 by an amount of each of the wave number vectors $\xi_2$ and $\xi_3$. Expressions used at this time are four expressions, in total, including two expressions (corresponding to two phases) regarding the direction of the wave number vector $\xi_1$, one expression regarding a direction of the wave number vector $\xi_2$, and one expression regarding a direction of the wave number vector $\xi_3$.

Third step: The restoration values of the respective restoration points 1, 2, and 5 are used to determine restoration values of the remaining respective restoration points 9, 10, 11, and 12, which are displaced from the restoration points 1, 2, and 5 by an amount of each of the wave number vectors $\xi_2$ and $\xi_3$. Expressions used at this time are four expressions, in total, including two expressions (corresponding to two observation points) regarding the direction of the wave number vector $\xi_2$, and two expressions (corresponding to two observation points) regarding the direction of the wave number vector $\xi_3$.

The solving method of the simultaneous equations made of the twelve expressions described in this Section is not limited to follow the above-described procedure, as a matter of course.

[Section 1.7 (Modified Example of Four-Image-Three-Point Restoration in 2D-SIM)]

This Section describes a modified example of the four-image-three-point restoration.

In this Section, the phase number in all of the three directions is suppressed to one, and instead of that, one piece of non-modulated image is acquired, and a spectrum of the non-modulated image is generated.

The non-modulated image corresponds to an image acquired under a condition of $K^{(0)}=1$, and can be acquired in a state where, for example, the diffraction grating 16 and the beam selecting section 18 described above are removed from the optical path. Further, the spectrum of the non-modulated image is obtained by performing Fourier transform on the non-modulated image.

As described above, in this Section, the number of pieces of the modulated images (number of spectra of the modulated images) is three, and the number of piece of the non-modulated image (number of spectrum of the non-modulated image) is one, so that twelve observation values, in total, are obtained from three observation points. By creating simultaneous equations of the twelve expressions regarding the twelve observation values (nine expressions 1.7 regarding the spectra of the modulated images and three expressions 1.53 regarding the spectrum of the non-modulated image) and solving the equations, restoration values of twelve restoration points are individually determined.

Note that in this Section, the following condition is required.

$$\cos(\phi_1 - \phi_2 - \phi_3) \neq 0 \tag{1.52}$$

$$I^{(0)} = \mathrm{OTF}(\xi)\tilde{I}_o(\xi) \tag{1.53}$$

[Section 1.9 (Simultaneous-Three-Direction-Four-Image-Three-Point Restoration in 2D-SIM)]

In this Section, "simultaneous-three-direction-four-image-three-point restoration" will be described as a modified example of the four-image-three-point restoration.

First, in this Section, interference fringes projected onto a sample are set to be formed by summing up three interference fringes with different directions (three-direction interference fringes), as will be described below. Note that a projection method of the three-direction interference fringes will be described later.

$$K(x) = 1 + 2a \sum_{i=1}^{3} \cos\left(\frac{2\pi}{\lambda}\xi_i \cdot x + \phi_i\right) \tag{1.59}$$

Specifically, in this Section, three-direction interference fringes having the three wave number vectors $\xi_1$, $\xi_2$, and $\xi_3$ at the same time are employed, the three-direction interference fringes are used to acquire four pieces of modulated images with mutually different phases, and spectra of the respective four pieces of modulated images are generated.

Note that it is set that $|\xi_i| \leq 2\mathrm{NA}$ (i=1, 2, 3), and the three wave number vectors $\xi_1$, $\xi_2$, and $\xi_3$ are set to have a closed relationship ($\xi_3 = \xi_1 - \xi_2$).

Further, a value of a which defines an amplitude of the three-direction interference fringes is set to be selected to satisfy the following expression.

$$K(x) \geq 0, \forall x$$

First, on a certain observation point $\xi$ in a spectrum of a certain piece of modulated image acquired in this Section, restoration values of seven restoration points, in total, including a restoration value which should be given to a restoration point $\xi$ in a spectrum of a S demodulated image, and restoration values which should be given to restoration points ($\xi \pm \xi_i$) (i=1, 2, 3) in the spectrum of the demodulated image, are superimposed.

In other words, on the certain observation point $\xi$ is in the spectrum of the modulated image, seven components, in total, being a 0th-order modulating component of fluorescence, ±first-order modulating components of fluorescence based on the wave number vector $\xi_1$, ±first-order modulating components of fluorescence based on the wave number vector $\xi_2$, and ±first-order modulating components of fluorescence based on the wave number vector $\xi_3$, are superimposed.

Here, in the spectrum of the modulated image, a triangle drawn by the three wave number vectors $\xi_1$, $\xi_2$, and $\xi_3$ is imagined, and an attention is focused on three observation points $\xi$, ($\xi + \xi_1$), and ($\xi + \xi_2$) positioned at vertices of the triangle.

In the entire three observation points $\xi$, ($\xi + \xi_1$), and ($\xi + \xi_2$), restoration values of twelve restoration points are included.

FIG. 22 are graphical representations thereof. Note that it is set that $|\xi_1| = |\xi_2|$, and $\xi_1 \cdot \xi_2 = |\xi_1||\xi_2|/2$.

Figure 22A:
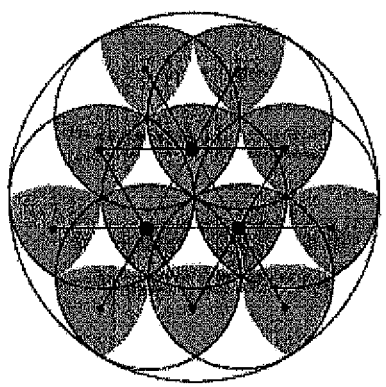
FIG. 22A and FIG. 22B are graphical representations of an expression 1.63 in Section 1.9.

Three large black points in FIG. 22A indicate three observation points positioned at vertices of a triangle drawn by the three wave number vectors $\xi_1$, $\xi_2$, and $\xi_3$ in the spectrum of the modulated image, and the three large black points and nine small black points in FIG. 22A indicate restoration points (twelve restoration points, in total) restored from the three observation points.

As described above, since the number of pieces of modulated images (number of spectra) is four in this Section, twelve observation values, in total, are obtained from the three observation points. By creating simultaneous equations of the twelve expressions regarding the twelve observation values and solving the equations, restoration values of twelve restoration points are individually determined.

Further, in this Section, by repeatedly calculating twelve restoration values while moving three observation points, restoration values of the entire painted-out area illustrated in FIG. 22A are determined.

Figure 22B:
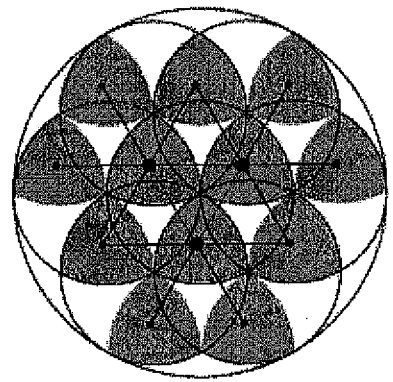

Note that FIG. 22B is a graphical representation when a similar restoration is performed by inverting the direction of the triangle. The restoration in FIG. 22A and the restoration in FIG. 22B can be conducted in a parallel manner. In this Section, the two ways of restorations are conducted, to thereby restore an area same as the painted-out area illustrated in FIG. 20.

Here, phases (formed of three components) of the three-direction interference fringes reflected on the respective four pieces of modulated images $I^{(1)}$, $I^{(2)}$, $I^{(3)}$, and $I^{(4)}$ are represented as follows, for example.

$$(\phi_1^{(1)}, \phi_2^{(1)}, \phi_3^{(1)}) = (0, 0, 0) \tag{1.65}$$

$$(\phi_1^{(2)}, \phi_2^{(2)}, \phi_3^{(2)}) = (\pi, 0, \pi) \tag{1.66}$$

$$(\phi_1^{(3)}, \phi_2^{(3)}, \phi_3^{(3)}) = (0, \pi, -\pi) \tag{1.67}$$

$$(\phi_1^{(4)}, \phi_2^{(4)}, \phi_3^{(4)}) = (0, 0, 0) \tag{1.68}$$

Specifically, an interference fringe intensity distribution of each of the four pieces of modulated images $I^{(1)}$, $I^{(2)}$, $I^{(3)}$, and $I^{(4)}$ is represented as follows.

$$K_1(x) = 1 + 2a\left(\cos\left(\frac{2\pi}{\lambda}\xi_1 \cdot x\right) + \cos\left(\frac{2\pi}{\lambda}\xi_2 \cdot x\right) + \cos\left(\frac{2\pi}{\lambda}\xi_3 \cdot x\right)\right) \tag{1.69}$$

$$K_2(x) = 1 + 2a\left(-\cos\left(\frac{2\pi}{\lambda}\xi_1 \cdot x\right) + \cos\left(\frac{2\pi}{\lambda}\xi_2 \cdot x\right) - \cos\left(\frac{2\pi}{\lambda}\xi_3 \cdot x\right)\right) \tag{1.70}$$

$$K_3(x) = 1 + 2a\left(\cos\left(\frac{2\pi}{\lambda}\xi_1 \cdot x\right) - \cos\left(\frac{2\pi}{\lambda}\xi_2 \cdot x\right) - \cos\left(\frac{2\pi}{\lambda}\xi_3 \cdot x\right)\right) \tag{1.71}$$

$$K_4(x) = 1 + 2a\left(-\cos\left(\frac{2\pi}{\lambda}\xi_1 \cdot x\right) - \cos\left(\frac{2\pi}{\lambda}\xi_2 \cdot x\right) + \cos\left(\frac{2\pi}{\lambda}\xi_3 \cdot x\right)\right) \tag{1.72}$$

Incidentally, a sum of the interference fringe intensity distributions of the four pieces of modulated images is represented as follows.

$$\sum_{i=1}^{4} K_i(x) = 1 \tag{1.73}$$

Specifically, if four pieces of modulated images are acquired under combinations of the interference intensity distributions and the phases described above, respective parts of a sample are illuminated by a mutually equal light intensity. Among the four pieces of modulated images, there is a relationship such that patterns of the three-direction interference fringes are common, and only a position of the pattern is shifted. Accordingly, the following relationship is satisfied.

$$K_2(x) = K_1\left(x + \frac{1}{2}a_1\right) \tag{1.74}$$

$$K_3(x) = K_1\left(x + \frac{1}{2}a_2\right) \tag{1.75}$$

$$K_4(x) = K_1\left(x + \frac{1}{2}a_1 + \frac{1}{2}a_2\right) \tag{1.76}$$

Note that $a_1$ and $a_2$ indicate fundamental vectors of grating when a pitch structure of the interference fringes is regarded as a crystal lattice, and when a reciprocal lattice vector (wave number vector) $k_i$ is set such that $k_1=(2\pi/\lambda)\xi_1$, $k_2=(2\pi/\lambda)\xi_2$, and $k_3=e_z$ ($e_z$: unit vector in z direction), $a_1$ and $a_2$ can be given by the following expression.

$$a_1 = 2\pi \frac{k_2 \times k_3}{k_1 \cdot (k_2 \times k_3)} \tag{1.77}$$

$$a_2 = 2\pi \frac{k_3 \times k_1}{k_2 \cdot (k_3 \times k_1)} \tag{1.78}$$

Figure 23:
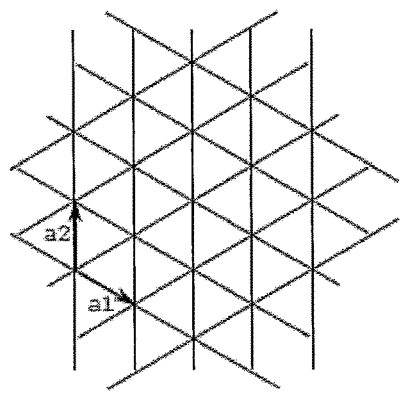
FIG. 23 is a diagram illustrating a relationship of a grating structure of three-direction interference fringes and fundamental vectors $a_1$ and $a_2$ of the grating.

FIG. 23 is a diagram illustrating a relationship of a grating structure of the three-direction interference fringes and the fundamental vectors $a_1$ and $a_2$ of the grating.

Figure 24:
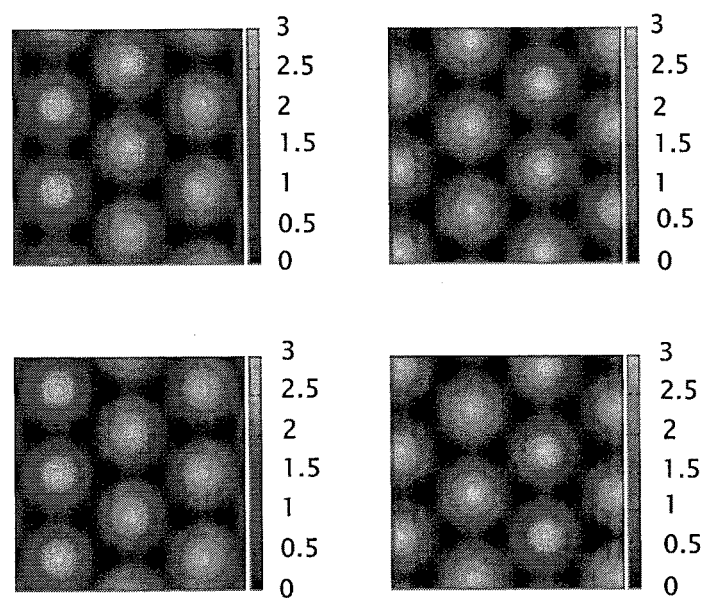
FIG. 24 is a diagram illustrating a relationship of interference fringe intensity distribution among four modulated images.

FIG. 24 is a diagram illustrating a relationship of interference fringe intensity distribution among four pieces of modulated images.

As illustrated in FIG. 24, among the four pieces of modulated images, grating patterns move in parallel so as not to overlap with one another. Further, a unit of movement amount of the pattern is half the fundamental vector of the grating.

[Section 1.9.2 (Projection Method of Three-Direction Interference Fringes)]

Here, the projection method of the three-direction interference fringes will be described.

In order to make the three-direction interference fringes to be generated in the above-described structured illuminating microscopy apparatus 1, it is possible to use the aforementioned diffraction grating 16 (FIG. 2A), similar to the case where other interference fringes (one-direction interference fringes) are made to be generated.

Note that an opening pattern of the beam selecting element 20 is set to cut, out of diffractive lights of three groups generated at the diffraction grating 16, 0th-order diffractive lights of the respective groups, high-order diffractive lights of second-order or higher of the respective groups, and +first-order diffractive lights of the respective groups, and to make only −first-order diffractive lights of the respective groups transmit therethrough. Accordingly, collecting points formed on a pupil plane are only collecting points formed of the three −first-order diffractive lights. FIG. 25A illustrates an arrangement of collecting points when excess diffractive lights are not cut by the beam selecting element 20, and FIG. 25B illustrates an arrangement of collecting points when the excess diffractive lights are cut by the beam selecting element 20. In this case, three collecting points are formed at positions displaced from one another by 120°. Three diffractive lights (three −first-order diffractive lights, in this case) exited from the three collecting points are incident, from three directions, on an illumination area of a sample, to thereby form three-direction interference fringes on the sample. Note that here, the diffractive lights which contribute to the interference fringes are set to the three −first-order diffractive lights, but, it is needless to say that the diffractive lights can also be set to the three +first-order diffractive lights.

Note that in this case, not the overlapped three ways of two-beam interference fringes, but the three-beam interference fringes are generated as the three-direction interference fringes, resulting in that the super-resolution effect is lowered. Further, since one of the ±first-order diffractive lights is cut, a utilization efficiency of laser light is lowered.

Accordingly, it is also possible to design as follows. Specifically, independent three laser light sources A, B, and C are prepared, and each of a laser light exited from the laser light source A, a laser light exited from the laser light source B, and a laser light exited from the laser light source C is branched by a two-direction branching fiber, to thereby form six point light sources a, a', b, b', c, and c'. Note that the point light sources a and a' are coherent light sources generated from the laser light source A, the point light sources b and b' are coherent light sources generated from the laser light source B, and the point light sources c and c' are coherent light sources generated from the laser light source C. Further, by appropriately laying the fiber, the six point light sources a, a', b, b', c, and c' are disposed on a pupil conjugate plane in a positional relationship such as one illustrated in FIG. 26. Specifically, an arranging direction of the point light sources a and a', an arranging direction of the point light sources b and b', and an arranging direction of the point light sources c and c' are set to directions which are different from one another by 120°. Six laser lights exited from the six point light sources are incident on the illumination area of the sample from six directions to form three-direction interference fringes on the sample.

Here, laser lights La and La' exited from the point light sources a and a', laser lights Lb and Lb' exited from the point light sources b and b', and laser lights Lc and Lc' exited from the point light sources c and c' do not interfere with one another. Accordingly, the interference fringes formed on the sample are made by overlapping three ways of two-beam interference fringes. Therefore, the super-resolution effect is never lowered, and the utilization efficiency of laser light is high.

Note that when the two-direction branching fiber is used, instead of the diffraction grating 16, as a branching unit of light as above, it is only required to change each of a phase contrast between the laser lights La and La', a phase contrast between the laser lights Lb and Lb', and a phase contrast between the laser lights Lc and Lc', instead of translatory shifting the diffraction grating 16 for changing the phases (formed of three components) of the three-direction interference fringes.

[Section 2.1 (Prerequisite of 3D-SIM)]

In this Section, a prerequisite of a demodulating calculation in the 3D-SIM will be described.

Here, an interference fringe intensity distribution in the 3D-SIM is assumed as follows.

If a wavelength of three-beam interference is set to $\lambda$, an interference fringe intensity distribution K (r) in the 3D-SIM is represented as follows.

$$K(r) = \left| \sum_j a_j e^{ik_j \cdot r} \right|^2 \quad (2.1)$$

Note that it is set that $k_0 = 2\pi/\lambda$, and $j = -1, 0, +1$, and a vector $k_j$ is defined as follows.

$$k_0 = k_0 e_z \quad (2.2)$$

$$k_+ = k_0(\sqrt{1-\xi_0^2} e_z + \xi_0) \quad (2.3)$$

$$k_- = k_0(\sqrt{1-\xi_0^2} e_z - \xi_0) \quad (2.4)$$

Here, it is set that $\xi_0 \cdot e_z = 0$.

If, for simplification, it is assumed that $a_0 = 1$, $a_+ = a = |a|e^{i\phi}$, and $a_- = a^* = |a|e^{-i\phi}$, the following expression is satisfied.

$$K(r) = |ae^{ik_+ \cdot r} + e^{ik_0 \cdot r} + a^* e^{ik_- \cdot r}|^2 \quad (2.5)$$

Accordingly, the interference fringe intensity distribution K is represented as follows. The fringes are formed by overlapping fringes of a first pitch having a sinusoidal intensity distribution (interference fringes formed of, out of three light fluxes made of a center light and lights on the right and left of the center light, the right and left lights), and fringes of a second pitch (which is double the first pitch) having a sinusoidal intensity distribution (interference fringes formed of, out of three light fluxes made of a center light and lights on the right and left of the center light, the center light and the right light (or the left right)).

$$K(x,z) = 1 + 2|a|^2 + a^* e^{i(k_- - k_0) \cdot r} + a e^{-i(k_- - k_0) \cdot r} + \quad (2.6)$$
$$ae^{i(k_+ - k_0) \cdot r} + a^* e^{-i(k_- - k_0) \cdot r} + a^{*2} e^{-i(k_+ - k_-) \cdot r} + a^2 e^{i(k_+ - k_-) \cdot r}$$

Here, if it is set that $\zeta_0 = \sqrt{[1-\xi_0^2]} - 1$, the following expression can be given.

$$K(x,z) = 1 + 2|a|^2 + a^*(e^{ik_0\zeta_0 z} + e^{-ik_0\zeta_0 z})e^{-k_0\xi_0 \cdot x} + a (e^{ik_0\zeta_0 z} + e^{-ik_0\zeta_0 z})e^{ik_0\xi_0 \cdot x} \quad (2.7)$$

$$+ a^{*2} e^{-2ik_0\xi_0 \cdot x} + a^2 e^{2ik_0\xi_0 \cdot x} \quad (2.8)$$

This is divided into a component which depends on z, and a component which depends on x, and represented as follows.

$$K(x,z) = \sum_{m=-2}^{2} K_m(z) J_m(x) \quad (2.9)$$

Note that the following expressions are given.

$$K_0(z) = 1 \quad (2.10)$$

$$K_{\pm 1}(z) = e^{ik_0\zeta_0 z} + e^{-ik_0\zeta_0 z} \quad (2.11)$$

$$K_{\pm 2}(z) = 1 \quad (2.12)$$

$$J_0 = 1 + 2|a|^2 \quad (2.13)$$

$$J_1 = ae^{ik_0\xi_0 \cdot x} \quad (2.14)$$

$$J_2 = a^2 e^{2ik_0\xi_0 \cdot x} \quad (2.15)$$

Note that it is set that $J_{-1} = J_1^*$, and $J_{-2} = J_2^*$.

Incidentally, if a fluorescent material density of a sample is set to $I_0$ (x) and the interference fringes with the interference fringe intensity distribution K described above are projected onto the sample, a fluorescence intensity distribution of the sample is assumed to be represented by $I_0$ (r) K (r), and an approximation (Born approximation) in which a fluorescence generated at each point of the sample does not excite a fluorescent material at another point, is employed.

At this time, a modulated image I (x, z) acquired in the 3D-SIM mode is represented as follows.

$$I(x,z) = (I_o(x,z)K(x,z)) \otimes PSF(x,z) \quad (2.16)$$

Specifically, the following expression is given.

$$I(x,z) = \sum_m \int PSF(x-x', z-z') K_m(z) J_m(x,z) I_o(x,z) d^3x \quad (2.17)$$

Here, if a starting point in the z direction (optical axis direction) of the interference fringes is set so that a z coordinate (z') of an observation point always becomes a center, the following expression is given.

$$I(x,z) = \sum_m \int PSF(x-x', z-z') K_m(z-z') J_m(x,z') I_o(x,z') d^3x' \quad (2.18)$$

If a three-dimensional OTF is set as represented by $$OTF_m(\xi,\zeta) = \mathcal{F}^{-1}[PSF(x,z) K_m(z)] \quad (2.19),$$

$$OTF_{\pm 2}(\xi,\zeta) = OTF_0(\xi,\zeta) \quad (2.20)$$

$$OTF_{\pm 1}(\xi,\zeta) = OTF_0(\xi,\zeta-\zeta_0) + OTF_0(\xi,\zeta+\zeta_0) \quad (2.21)$$

is given.

Further, a result of representing the modulated image on a Fourier space (namely, a spatial frequency spectrum of the modulated image) is represented as follows.

$$\tilde{I}(\xi,\zeta) = \sum_m OTF_m(\xi,\zeta)[\tilde{J}_m(\xi,\zeta) \otimes \tilde{I}_o(\xi,\zeta)] \quad (2.22)$$

When this is written down, the following expression is given.

$$\tilde{I}(\xi,\zeta) = OTF_0(\xi,\zeta)\tilde{I}_o(\xi,\zeta) + \quad (2.23)$$
$$b^* OTF_1(\xi,\zeta)\tilde{I}_o(\xi-\xi_0,\zeta) + bOTF_1(\xi,\zeta)\tilde{I}_o(\xi+\xi_0,\zeta) +$$
$$c^* OTF_0(\xi,\zeta)\tilde{I}_o(\xi-2\xi_0,\zeta) + cOTF_0(\xi,\zeta)\tilde{I}_o(\xi+2\xi_0,\zeta)$$

Note that the following expression is given so that a coefficient of a first term becomes one.

$$b = \frac{|a|e^{i\phi}}{1+2|a|^2} \quad (2.24)$$

$$c = \frac{|a|^2 e^{2i\phi}}{1+2|a|^2} \quad (2.25)$$

Note that a, b, and c are values determined based on an intensity balance of the three light fluxes (±first-order diffractive lights and 0th-order diffractive light) which contribute to the interference fringes in the 3D-SIM.

Hereinafter, the spatial frequency spectrum on the Fourier space is simply referred to as "spectrum". Further, $\phi$ appeared in the expression is referred to as "phase", hereinafter.

[Section 2.2 (Conventional 3D-SIM)]

In this Section, a demodulating calculation of the conventional 3D-SIM will be described for comparison.

First, on an observation point $\xi$ in a spectrum of a modulated image acquired in the 3D-SIM mode, five components being a −first-order modulating component of fluorescence, a +first-order modulating component of fluorescence, a −second-order modulating component of fluorescence, a +second-order modulating component of fluorescence, and a 0th-order modulating component of fluorescence are superimposed. The ±first-order modulating components superimposed on the observation point $\xi$ are values (restoration values) which should be possessed by restoration points $(\xi \pm \xi_0)$ in a spectrum of a demodulated image, the ±second-order modulating components superimposed on the observation point $\xi$ are values (restoration values) which should be possessed by restoration points $(\xi \pm 2\xi_0)$ in the spectrum of the demodulated image, and the 0th-order modulating component superimposed on the observation point $\xi$ is a value (restoration value) which should be possessed by a restoration point $\xi$ in the spectrum of the demodulated image.

Specifically, the ±first-order modulating components superimposed on the observation point $\xi$ are components modulated by fringes of the second pitch (which is double the first pitch) having the sinusoidal intensity distribution (interference fringes formed of, out of three light fluxes made of a center light and lights on the right and left of the center light, the center light and the right light (or the left right)), and the ±second-order modulating components superimposed on the observation point $\xi$ are components modulated by fringes of the first pitch having the sinusoidal intensity distribution (interference fringes formed of, out of three light fluxes made of a center light and lights on the right and left of the center light, the right and left lights).

Figure 27A:
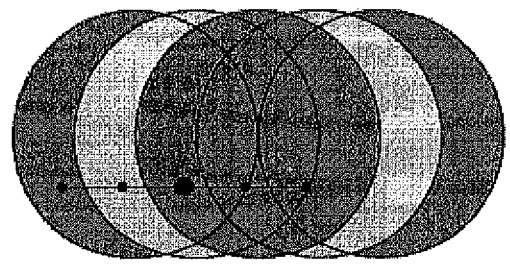
FIG. 27A is a diagram illustrating a frequency range (xy cross section) of a demodulated image of a conventional 3D-SIM.
Figure 27B:
FIG. 27B is a diagram illustrating a frequency range (zx cross section) of the demodulated image of the conventional 3D-SIM.

This applies to each observation point in the spectrum of the modulated image. A large black point in FIG. 27 corresponds to a certain observation point, and the large black point and four small black points on both sides of the large black point correspond to five restoration points restored from the observation point.

Accordingly, in the demodulating calculation of the conventional 3D-SIM, in order to make the five modulating components superimposed on each observation point in the spectrum of the modulated image to be separated from one another, five pieces of modulated images with different phases have been acquired to generate spectra of the respective modulated images. Conventionally, by creating simultaneous equations of five equations satisfied by the spectra and solving the simultaneous equations, restoration values of a painted-out area (normal resolution range and super-resolution range) in FIG. 27 have been determined.

[Section 2.4 (Nine-Image-Two-Point Restoration in 3D-SIM)]

In this Section, "nine-image-two-point restoration" will be described as a demodulating calculation of the 3D-SIM in the present embodiment. It is set that the acquirement of modulated images in this Section is performed when the aforementioned controlling device 43 controls the respective parts, and the calculation in this Section is executed by the aforementioned image storing-calculating device 44 (which similarly applies to the other Sections).

This Section focuses attention on the fact that, in a spectrum of one piece of modulated image acquired by the 3D-SIM, modulating components with mutually common values are superimposed on two observation points $\xi$ and $(\xi+\xi_0)$ which are separated by a modulation frequency $\xi_0$ in a modulating direction.

Concretely, each of a −first-order modulating component of fluorescence superimposed on the observation point $\xi$ and a 0th-order modulating component of fluorescence superimposed on the observation point $(\xi+\xi_0)$ corresponds to a restoration value of a restoration point $(\xi+\xi_0)$, each of a −second-order modulating component of fluorescence superimposed on the observation point $\xi$ and a −first-order modulating component of fluorescence superimposed on the observation point $(\xi+\xi_0)$ corresponds to a restoration value of a restoration point $(\xi+2\xi_0)$, each of a +first-order modulating component of fluorescence superimposed on the observation point $(\xi+\xi_0)$ and a 0th-order modulating component of fluorescence superimposed on the observation point $\xi$ corresponds to a restoration value of a restoration point $\xi$, and each of a +second-order modulating component of fluorescence superimposed on the observation point $(\xi+\xi_0)$ and a +first-order modulating component of fluorescence superimposed on the observation point $\xi$ corresponds to a restoration value at $(\xi-\xi_0)$. Specifically, the two observation points $\xi$ and $(\xi+\xi_0)$ include the mutually common restoration values of the four restoration points $(\xi-\xi_0)$, $\xi$, $(\xi+\xi_0)$, and $(\xi+2\xi_0)$.

The nine-image-two-point restoration in this Section utilizes this relationship. Concrete description will be made hereinafter.

In a spectrum of one piece of modulated image, an observation value at an observation point $\xi$ and an observation value at an observation point $(\xi+\xi_0)$ are represented by the following expression.

$$\tilde{I}(\xi,\zeta) = OTF_0(\xi,\zeta)\tilde{I}_o(\xi,\zeta) + \quad (2.31)$$
$$b^* OTF_1(\xi,\zeta)\tilde{I}_o(\xi-\xi_0,\zeta) + bOTF_1(\xi,\zeta)\tilde{I}_o(\xi+\xi_0,\zeta) +$$
$$c^* OTF_0(\xi,\zeta)\tilde{I}_o(\xi-2\xi_0,\zeta) + cOTF_0(\xi,\zeta)\tilde{I}_o(\xi+2\xi_0,\zeta)$$

$$\tilde{I}(\xi+\xi_0,\zeta) = OTF_0(\xi+\xi_0,\zeta)\tilde{I}_o(\xi+\xi_0,\zeta) + \quad (2.32)$$
$$b^* OTF_1(\xi+\xi_0,\zeta)\tilde{I}_o(\xi,\zeta) + bOTF_1(\xi+\xi_0,\zeta)\tilde{I}_o(\xi+2\xi_0,\zeta) +$$
$$c^* OTF_0(\xi+\xi_0,\zeta)\tilde{I}_o(\xi-\xi_0,\zeta) + cOTF_0(\xi+\xi_0,\zeta)\tilde{I}_o(\xi+3\xi_0,\zeta)$$

Accordingly, in this Section, three pieces of modulated images having the same wave number vector $\xi_0$ and mutually different phases $\phi$ are acquired to generate spectra of the respective three pieces of modulated images, six observation values, in total, regarding the two observation points $\xi$ and $(\xi+\xi_0)$ are referred to from the respective three spectra, and the six observation values are applied to these expressions, thereby obtaining six expressions, in total, including six restoration values (unknowns).

Figure 28A:
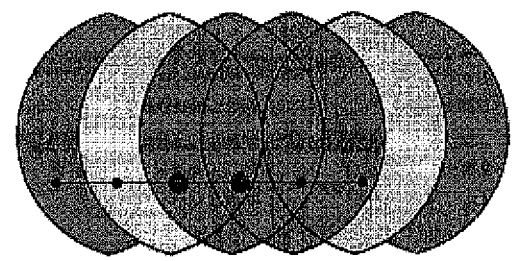
FIG. 28A is a diagram illustrating a frequency range (xy cross section) of a demodulated image in Section 2.4.
Figure 28B:
FIG. 28B is a diagram illustrating a frequency range (zx cross section) of the demodulated image in Section 2.4.

FIG. 28 are diagrams each illustrating a frequency range of a demodulated image in the 3D-SIM in this Section. FIG. 28A illustrates a xy cross section, and FIG. 28B illustrates a zx cross section.

Large black points in FIG. 28 indicate two certain observation points $\xi$ and $(\xi+\xi_0)$ which are displaced by $\xi_0$, and the two large black points and four small black points in FIG. 28 indicate restoration points (six restoration points, in total) restored from the observation points $\xi$ and $(\xi+\xi_0)$.

The above-described explanation corresponds to an explanation of restoration regarding a certain wave number vector (one direction).

Accordingly, in this Section, three pieces of modulated images with different phases are acquired under each of three wave number vectors whose directions are mutually different, spectra of the respective modulated images are generated, and restoration processing similar to the above-described restoration processing is performed on the spectra, for each direction. This makes it possible to acquire a demodulated image with wide frequency range.

Note that in this Section, it is desirable that a phase contrast $\Delta\phi$ among the three pieces of modulated images acquired under the same wave number vector is set to $2\pi/3$.

[Section 2.5 (Seven-Image-Three-Point Restoration in 3D-SIM)]

In this Section, a seven-image-three-point restoration in the 3D-SIM will be described. This Section applies Section 1.7 in which the spectrum of the non-modulated image is utilized, to the 3D-SIM.

First, in this Section, the number of directions (number of wave number vectors) is set to three.

Specifically, in this Section, the three wave number vectors $\xi_1$, $\xi_2$, and $\xi_3$ are set to have a closed relationship ($\xi_3=\xi_1-\xi_2$), and further, in return for acquiring one piece of non-modulated image, the phase number is reduced by one (the phase number is set to two) in each of the three directions.

Further, in this Section, a phase contrast $\Delta\phi$ between two pieces of modulated images acquired under the same wave number vector is set to $\Delta\phi=\pi$.

Further, in this case, the number of each of the three wave number vectors is set to k (k=1, 2, 3), and two pieces of modulated images with mutually different phases acquired under the k-th wave number vector are represented as follows.

$$I_{\phi_k}^{(k)}, I_{\phi_k+\Delta\phi_k}$$

Further, the non-modulated image is represented as $I^{(0)}$.

From an expression 2.23, the following expression is satisfied.

$$\tilde{I}_{\phi_k}^{(k)}(\xi,\zeta)=\tau_0\tilde{I}_o(\xi,\zeta)+\tau'_0\tilde{I}_{1,\phi_k}^{(k)}(\xi,\zeta)+\tau_0\tilde{I}_{2,\phi_k}^{(k)}(\xi,\zeta) \quad (2.34)$$

Note that the respective ±first-order modulating components and ±second-order modulating components are collectively represented as follows.

$$\tilde{I}_{1,\phi_k}^{(k)}(\xi,\zeta)=|b_k|e^{-i\phi k}\tilde{I}_o(\xi-\xi_k,\zeta)+|b_k|e^{i\phi k}\tilde{I}_o(\xi+\xi_k,\zeta) \quad (2.35)$$

$$\tilde{I}_{2,\phi_k}^{(k)}(\xi,\zeta)=|c_k|e^{-2i\phi k}\tilde{I}_o(\xi-2\xi_k,\zeta)+|c_k|e^{2i\phi k}\tilde{I}_o(\xi+2\xi_k,\zeta) \quad (2.36)$$

Further, it is set that $\tau_0=OTF_0\ (\xi,\zeta)$, and $\tau_0'=OTF_1\ (\xi,\zeta)$.

Here, the phase contrast $\Delta\phi$ between the two pieces of modulated images acquired under the same wave number vector is set to $\Delta\phi=\pi$, so that from an expression 2.35, the following expression is satisfied.

$$\tilde{I}_{1,\phi_k+\pi}^{(k)}(\xi,\zeta)=-\tilde{I}_{1,\phi_k}^{(k)}(\xi,\zeta) \quad (2.37)$$

$$\tilde{I}_{2,\phi_k+\pi}^{(k)}(\xi,\zeta)=\tilde{I}_{2,\phi_k}^{(k)}(\xi,\zeta) \quad (2.38)$$

Accordingly, the following expression is obtained from an expression 2.34.

$$\tilde{I}_{\phi_k}^{(k)}(\xi,\zeta)=\tau_0\tilde{I}_o(\xi,\zeta)+\tau'_0\tilde{I}_1^{(k)}(\xi,\zeta)+\tau_0\tilde{I}_2^{(k)}(\xi,\zeta) \quad (2.39)$$

$$\tilde{I}_{\phi_k+\pi}^{(k)}(\xi,\zeta)=\tau_0\tilde{I}_o(\xi,\zeta)-\tau'_0\tilde{I}_1^{(k)}(\xi,\zeta)+\tau_0\tilde{I}_2^{(k)}(\xi,\zeta) \quad (2.40)$$

Note that for simplification, a subscript $\phi k$ is omitted in the right side.

Further, the 0th-order modulating component (normal resolution component) can be represented as follows.

$$\tilde{I}^{(0)}(\xi,\zeta)=\tau_0\tilde{I}_o(\xi,\zeta) \quad (2.41)$$

The expression 2.39, the expression 2.40, and the expression 2.41 described above are represented as follows when being collectively written by a matrix.

$$\begin{bmatrix} \tilde{I}^{(0)}(\xi,\zeta) \\ \tilde{I}_{\phi k}^{(k)}(\xi,\zeta) \\ \tilde{I}_{\phi k+\pi}^{(k)}(\xi,\zeta) \end{bmatrix} = \begin{bmatrix} \tau_0 & 0 & 0 \\ \tau_0 & \tau'_0 & \tau_0 \\ \tau_0 & -\tau'_0 & \tau_0 \end{bmatrix} \begin{bmatrix} \tilde{I}_o(\xi,\zeta) \\ \tilde{I}_1^{(k)}(\xi,\zeta) \\ \tilde{I}_2^{(k)}(\xi,\zeta) \end{bmatrix} \quad (2.42)$$

Accordingly, in this Section, seven observation values regarding observation points 4 in spectra of respective seven pieces of modulated images are first applied to an expression 2.42, thereby determining each of seven restoration values in the right side of the expression 2.42, namely, each of the following restoration values (±first-order modulating components, ±second-order modulating components, and 0th-order modulating component).

$$\tilde{I}_1^{(k)}, \tilde{I}_2^{(k)} (k=1,2,3), \tilde{I}_o$$

A calculation to be performed hereinbelow is similar to the calculation in Section 1.7. Specifically, in the spectrum represented by $$\tilde{I}_1^{(k)} (k=1,2,3), \tilde{I}_o,$$

it is possible to separate, based on twelve observation values regarding arbitrary three observation points which are mutually displaced by an amount of each of the three wave number vectors $\xi_k$ (k=1, 2, 3), the +first-order modulating component and the −first-order modulating component of fluorescence superimposed on the three observation points.

Further, in the spectrum represented by)

$$\tilde{I}_2^{(k)} (k=1,2,3), \tilde{I}_o,$$

it is possible to separate, based on twelve observation values regarding arbitrary three observation points which are mutually displaced by a doubled amount of each of the three wave number vectors $2\xi_k$ (k=1, 2, 3), the +second-order modulating component and the −second-order modulating component of fluorescence superimposed on the three observation points.

[Section 2.6 (Twelve-Image-Three-Point Restoration in 3D-SIM)]

In this Section, for the purpose of maintaining the calculation accuracy, rather than reducing the number of pieces of images (number of spectra), the number of directions (number of wave number vectors) is set to three, and the phase number in each direction is set to four, to thereby acquire twelve pieces of modulated images, in total (twelve spectra, in total, are generated).

Further, in this Section, a phase contrast $\Delta\phi$ among the four pieces of modulated images acquired under the same wave number vector is set to $\Delta\phi=\pi/2$.

Further, in this case, the direction number is set to k (k=1, 2, 3), and the phase number is set to l (l=0, 1, 2, 3).

First, from the expression 2.35, the ±first-order modulating components are represented by the following expression.

$$\tilde{I}_{1,\phi_k}^{(k)}(\xi,\zeta)=|b_k|e^{-i\phi kl}{}_o(\xi-\xi_k,\zeta)+|b_k|e^{i\phi kl}{}_o(\xi+\xi_k,\zeta) \quad (2.47)$$

$$\tilde{I}_{1,\phi_k+\pi/2}^{(k)}(\xi,\zeta)=-i|b_k|e^{-i\phi kl}{}_o(\xi-\xi_k,\zeta)+i|b_k|e^{i\phi kl}{}_o(\xi+\xi_k,\zeta) \quad (2.48)$$

$$\tilde{I}_{1,\phi_k+\pi}^{(k)}(\xi,\zeta)=-|b_k|e^{-i\phi kl}{}_o(\xi-\xi_k,\zeta)-|b_k|e^{i\phi kl}{}_o(\xi+\xi_k,\zeta) \quad (2.49)$$

$$\tilde{I}_{1,\phi_k-\pi/2}^{(k)}(\xi,\zeta)=i|b_k|e^{-i\phi kl}{}_o(\xi-\xi_k,\zeta)-i|b_k|e^{i\phi kl}{}_o(\xi+\xi_k,\zeta) \quad (2.50)$$

Further, from the expression 2.36, the ±second-order modulating components are represented by the following expression.

$$\tilde{I}_{2,\phi_k}^{(k)}(\xi,\zeta)=|c_k|e^{-2i\phi kl}{}_o(\xi-2\xi_k,\zeta)+|c_k|e^{2i\phi kl}{}_o(\xi+2\xi_k,\zeta) \quad (2.51)$$

$$\tilde{I}_{2,\phi_k+\pi/2}^{(k)}(\xi,\zeta)=-|c_k|e^{-2i\phi kl}{}_o(\xi-2\xi_k,\zeta)-|c_k|e^{2i\phi kl}{}_o(\xi+2\xi_k,\zeta) \quad (2.52)$$

$$\tilde{I}_{2,\phi_k+\pi}^{(k)}(\xi,\zeta)=|c_k|e^{-2i\phi kl}{}_o(\xi-2\xi_k,\zeta)+|c_k|e^{2i\phi kl}{}_o(\xi+2\xi_k,\zeta) \quad (2.53)$$

$$\tilde{I}_{2,\phi_k-\pi/2}^{(k)}(\xi,\zeta)=-|c_k|e^{-2i\phi kl}{}_o(\xi-2\xi_k,\zeta)-|c_k|e^{2i\phi kl}{}_o(\xi+2\xi_k,\zeta) \quad (2.54)$$

Further, the following expression is satisfied.

$$\tilde{I}_{2,\phi_k}^{(k)}(\xi,\zeta)=\tilde{I}_{2,\phi_k+\pi}^{(k)}(\xi,\zeta)=-\tilde{I}_{2,\phi_k+\pi/2}^{(k)}(\xi,\zeta)=-\tilde{I}_{2,\phi_k-\pi/2}^{(k)}(\xi,\zeta) \quad (2.55)$$

Accordingly, when the demodulating calculation in this Section is written by a matrix, the following expression is given.

$$\begin{bmatrix} \tilde{I}_{\phi k}^{(k)}(\xi,\zeta) \\ \tilde{I}_{\phi k+\frac{\pi}{2}}^{(k)}(\xi,\zeta) \\ \tilde{I}_{\phi k+\pi}^{(k)}(\xi,\zeta) \\ \tilde{I}_{\phi k-\frac{\pi}{2}}^{(k)}(\xi,\zeta) \end{bmatrix} = \begin{bmatrix} \tau_0 & \tau_0'b_k^* & \tau_0'b_k & \tau_0 \\ \tau_0 & -i\tau_0'b_k^* & i\tau_0'b_k & -\tau_0 \\ \tau_0 & -\tau_0'b_k^* & -\tau_0'b_k & \tau_0 \\ \tau_0 & i\tau_0'b_k^* & -i\tau_0'b_k & -\tau_0 \end{bmatrix} \begin{bmatrix} \tilde{I}_o(\xi,\zeta) \\ \tilde{I}_o(\xi-\xi_k,\zeta) \\ \tilde{I}_o(\xi+\xi_k,\zeta) \\ \tilde{I}_2^{(k)}(\xi,\zeta) \end{bmatrix} \quad (2.56)$$

Therefore, in this Section, by applying observation values of the spectra of the twelve pieces of modulated images (twelve spectra) to this expression, the 0th-order modulating component and the ±first-order modulating components are separated.

Further, the remaining ±second-order modulating components are separated through a procedure similar to that in Section 1.7.

As described above, in this Section, it is possible to separate the ±first-order modulating components without conducting the procedure in Section 2.5, so that a high sectioning effect can be expected.

[Section 2.7 (Eight-Image-Three-Point Restoration in 3D-SIM)]

Note that the above-described Section 1.6 may also be applied to the 3D-SIM in the following manner.

In this Section, the number of directions (number of wave number vectors) is set to three.

Further, the three wave number vectors $\xi_1$, $\xi_2$, and $\xi_3$ are set to have a closed relationship ($\xi_3=\xi_1-\xi_2$).

Further, in any one direction (wave number vector $\xi_1$) out of the three directions, the phase number is set to four, and the phase number in each of the other two directions is suppressed to two.

Specifically, in this Section, in return for setting the three wave number vectors $\xi_1$, $\xi_2$, and $\xi_3$ to have the closed relationship ($\xi_3=\xi_1-\xi_2$), the number of modulated images in each of the two directions is reduced by one. Accordingly, the total number of modulated images (total number of spectra) becomes eight.

Note that in this Section, a phase contrast among the modulated images in the first direction (k=1) is set to $\Delta\phi=\pi/2$, a phase contrast between the modulated images in the second direction (k=2) is set to $\Delta\phi=\pi$, and a phase contrast between the modulated images in the third direction (k=3) is set to $\Delta\phi=\pi$.

With the use of the spectra of the eight pieces of modulated images acquired as above, it is possible to separate the respective modulating components. Specifically, it is only required to determine the 0th-order modulating component using the spectra of the four pieces of modulated images regarding the first direction (k=1) in the first step, and then to perform the separation of the ±first-order modulating components, and the ±second-order modulating components in the second step.

The many features and advantages of the embodiments are apparent from the detailed specification and, thus, it is intended by the appended claims to cover all such features and advantages of the embodiments that fall within the true spirit and scope thereof.

Further, since numerous modifications and changes will readily occur to those skilled in the art, it is not desired to limit the inventive embodiments to the exact construction and operation illustrated and described, and accordingly all suitable modifications and equivalents may be restored to, falling within the scope thereof.

What is claimed is:

1. A structured illuminating microscopy apparatus, comprising:
   an illuminating optical system performing a spatial modulation on a sample by fringes;
   an image-forming optical system forming an image of an observational light flux from the sample being performed the spatial modulation;
   an acquiring unit controlling at least one of a wave number vector of the fringes and a phase of the fringes, and acquiring a modulated image of the sample; and
   a calculating unit generating an image of the sample based on the modulated image acquired by the acquiring unit, wherein:
   the acquiring unit acquires a first modulated image having a first wave number vector of the fringes and a first phase of the fringes and a second modulated image having the first wave number vector of the fringes and a second phase of the fringes; and
   the calculating unit restores the modulated image based on observation points mutually displaced by an amount of the first wave number vector in a spatial frequency spectrum of the first modulated image having the first wave number vector and the first phase of the fringes and observation points mutually displaced by the amount of the first wave number vector in a spatial frequency spectrum of the second modulated image having the first wave number vector and the second phase of the fringes.

\* \* \* \* \*